US012363460B2

(12) United States Patent
Ishii et al.

(10) Patent No.: US 12,363,460 B2
(45) Date of Patent: Jul. 15, 2025

(54) SOLID-STATE IMAGING SENSOR

(71) Applicant: Panasonic Intellectual Property Management Co., Ltd., Osaka (JP)

(72) Inventors: Motonori Ishii, Osaka (JP); Mitsuyoshi Mori, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 18/448,673

(22) Filed: Aug. 11, 2023

(65) Prior Publication Data

US 2023/0388676 A1 Nov. 30, 2023

Related U.S. Application Data

(63) Continuation of application No. PCT/JP2022/012995, filed on Mar. 22, 2022.

(30) Foreign Application Priority Data

Mar. 29, 2021 (JP) ................................ 2021-055138

(51) Int. Cl.
*H04N 25/771* (2023.01)
*H04N 25/587* (2023.01)

(52) U.S. Cl.
CPC ......... *H04N 25/771* (2023.01); *H04N 25/587* (2023.01)

(58) Field of Classification Search
CPC ... H04N 25/771; H04N 25/587; H04N 25/773
See application file for complete search history.

(56) References Cited

U.S. PATENT DOCUMENTS

2008/0079044 A1* 4/2008 Wada .................. H04N 25/771 257/292
2017/0237922 A1* 8/2017 Kim .................... H04N 25/626 348/308
2020/0106982 A1* 4/2020 Kasuga ................ H10F 30/225

FOREIGN PATENT DOCUMENTS

JP 2008-085861 A 4/2008
WO 2018/216400 A1 11/2018
WO WO-2019186838 A1 * 10/2019 ............ E05D 3/122

OTHER PUBLICATIONS

International Search Report dated Jun. 14, 2022 issued in International Patent Application No. PCT/JP2022/012995, with English translation.

* cited by examiner

*Primary Examiner* — Nhan T Tran
(74) *Attorney, Agent, or Firm* — Rimon P.C.

(57) ABSTRACT

A solid state image sensor includes at least a plurality of pixel cells and a vertical scanning circuit. Each of the pixel cells includes an avalanche photodiode, a floating diffusion portion, a transfer transistor, a reset transistor, an amplifier transistor, a selection transistor, a count transistor, and a capacitor. The amplifier transistor outputs a voltage signal responsive to the amount of charge stored in the floating diffusion portion. The capacitor has terminals one of which is connected to the count transistor. The vertical scanning circuit is configured to be able to supply different levels of voltages to the other terminals of the capacitors.

6 Claims, 22 Drawing Sheets

LIGHT PULSE PERIOD (OPTIONAL NUMBER OF TIMES)
LIGHT EXPOSURE STEP
READOUT STEP
LIGHT PULSE PERIOD 1
LIGHT PULSE PERIOD 2
ROLLING READOUT PERIOD
PERIOD FOR ONE ROW
10
12
RSD
13
VDD
A
VSL
4
5
9
6
RST
TRN
3
2
$V_{APD}$
$V_{FD}$
FD
SEL
1
B
APD
CNT
7
11
VSUB
$V_{MIM}$
B A
8
MIM
CSW
LIGHT
TRN
RST
CNT
CSW
SEL
$V_{FD}$
$V_{MIM}$
$V_{APD}$
I II III IV V VI VII VIII
IX X XI XII XIII XIV XV

VSL
9
13
VDD
5
6
SEL
RSD
12
4
RST
2
$V_{FD}$
FD
TRN
3
CNT
7
$V_{MIM}$
MIM
8
CSW
10
$V_{APD}$
1
APD
VSUB
11
42
40
41
Hi
Lo

LIGHT PULSE PERIOD
(OPTIONAL NUMBER OF TIMES)
LIGHT EXPOSURE STEP
READOUT STEP
LIGHT PULSE PERIOD 1
LIGHT PULSE PERIOD 2
ROLLING READOUT PERIOD
PERIOD FOR ONE ROW
LIGHT
TRN
RST
CNT
CSW
SEL
V_FD
V_MIM
V_APD
I
II
III
IV
V
VI
VII
VIII
IX
X
XI
XII
XIII
XIV
XV

| COUNT | TRANSFER CHARGE (fC) | ELECTRIC POTENTIAL STORED IN MIM (V) |
|---|---|---|
| 0 | 0 | 3 |
| 1 | 0.8 | 2.95 |
| 2 | 0.8 | 2.9 |
| 3 | 0.8 | 2.85 |
| 4 | 0.8 | 2.8 |
| 5 | 0.8 | 2.75 |
| 6 | 0.8 | 2.7 |
| 7 | 0.8 | 2.65 |
| 8 | 0.8 | 2.6 |
| 9 | 0.8 | 2.55 |
| 10 | 0.8 | 2.5 |
| 11 | 0.8 | 2.5 |
| 12 | 0.8 | 2.5 |
| 13 | 0.8 | 2.5 |
| 14 | 0.8 | 2.5 |
| 15 | 0.8 | 2.5 |

SOLID-STATE IMAGING SENSOR

CROSS-REFERENCE TO RELATED APPLICATIONS

This is a continuation of International Application No. PCT/JP2022/012995 filed on Mar. 22, 2022 which claims priority to Japanese Patent Application No. 2021-055138 filed on Mar. 29, 2021. The entire disclosures of these applications are incorporated by reference herein.

BACKGROUND

The present disclosure relates to a solid state image sensor.

A solid state image sensor that has been known in the art includes pixel cells each including a charge-storage capacitor to increase the dynamic range of the output (see, for example, Japanese Unexamined Patent Publication No. 2008-085861). Another known solid state image sensor for detecting feeble light having a photon counting function includes pixel cells each including a capacitor, and is capable of counting the number of photons incident for a predetermined period, based on the amount of charge stored in the capacitor (see, for example, International Publication No. WO 2018/216400).

SUMMARY

The known solid state image sensor disclosed in International Publication No. WO 2018/216400 includes pixel cells each including an avalanche photodiode (in some cases, hereinafter referred to as the "APD"), six transistors, and a capacitor serving as a memory, and has the pixel cells miniaturized while having the photon counting function.

Meanwhile, in recent years, there has been an increasing need for a higher degree of integration and miniaturization of a solid state image sensor having this particular function.

The present disclosure has been made in view of such circumstances, and an object thereof is to provide a more highly integrated solid state image sensor having a photon counting function.

To achieve the foregoing object, a solid state image sensor according to the present disclosure includes at least: a plurality of pixel cells arranged in a matrix; and a row control circuit configured to control operations of the plurality of pixel cells. Each of the pixel cells includes at least: an avalanche photodiode configured to convert received light into charge; a floating diffusion portion configured to store the charge generated in the avalanche photodiode; a transfer transistor connected to the avalanche photodiode and the floating diffusion portion; a reset transistor connected to a first power supply and the floating diffusion portion; an amplifier transistor connected to a second power supply and the floating diffusion portion to output a voltage signal responsive to an amount of charge stored in the floating diffusion portion; a selection transistor connected to the amplifier transistor to transfer an output signal from the amplifier transistor to a vertical signal line; a count transistor connected to the floating diffusion portion; and a capacitor having terminals one of which is connected to the count transistor. The row control circuit is configured to be able to supply different levels of voltages to the other terminals of the capacitors.

According to the present disclosure, the number of elements in each pixel cell can be reduced, thereby miniaturizing the pixel cell. Thus, a highly integrated solid state image sensor having a photon counting function can be provided.

BRIEF DESCRIPTION OF THE DRAWINGS

FIG. 8 shows an example of the relationship among the photon count, the charge transferred to a capacitor, and the electric potential stored in the capacitor in the light exposure step.

DETAILED DESCRIPTION

Embodiments of the present disclosure are described below with reference to the drawings. The following description of advantageous embodiments is a mere example in nature, and is not at all intended to limit the scope, applications, or use of the present disclosure.

EMBODIMENTS

[Configuration of Solid State Image Sensor]

Figure 1:
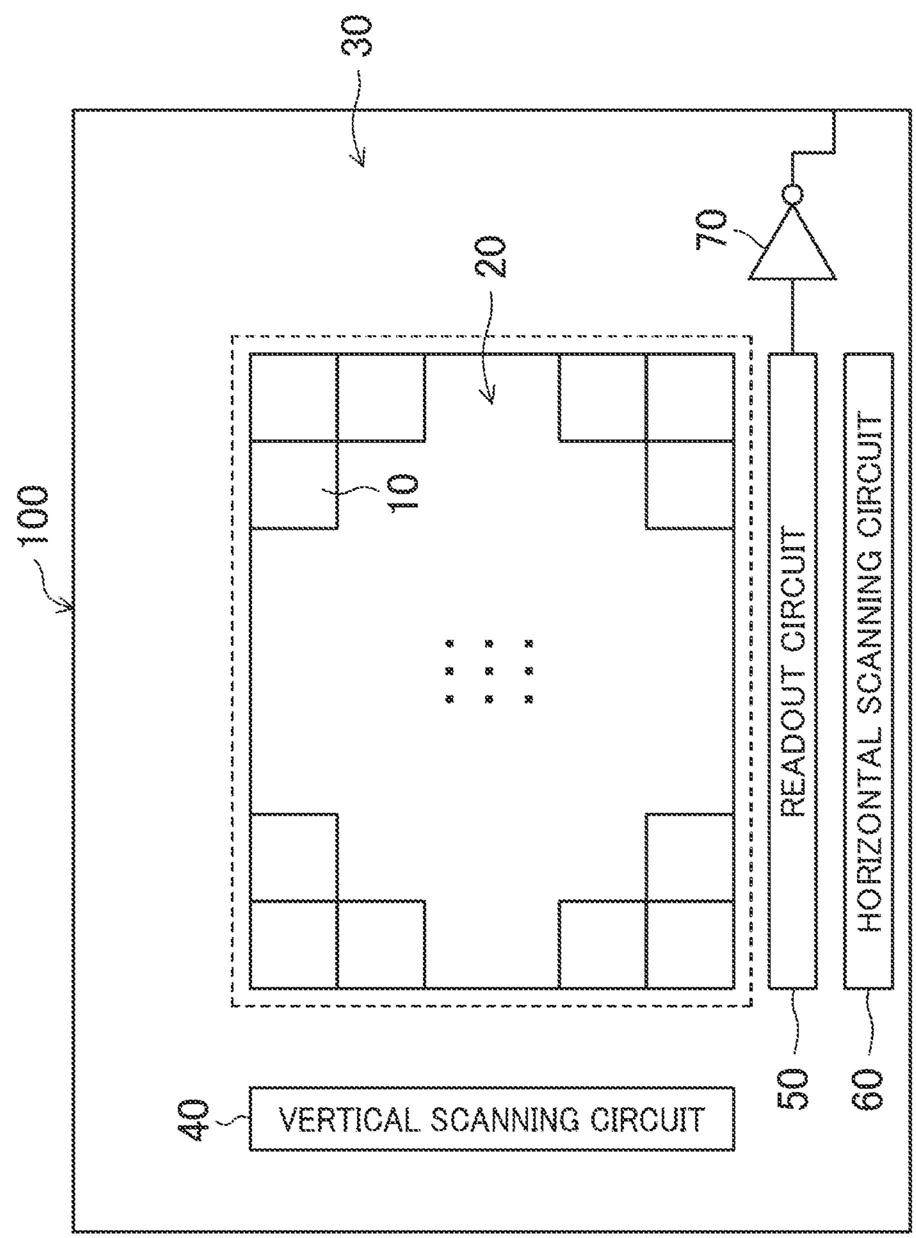
FIG. 1 is a schematic configuration diagram of a solid state image sensor according to an embodiment.

FIG. 1 shows a plan view of a solid state image sensor according to this embodiment. For convenience of description, a circuit configuration of each of pixel cells 10 and the relationship of connection between a pixel cell array 20 and a peripheral circuit section 30 are omitted in FIG. 1. FIG. 1 shows only portion of the peripheral circuit section 30.

As shown in FIG. 1, a solid state image sensor 100 includes the pixel cell array 20 and the peripheral circuit section 30. Although not shown, the solid state image sensor 100 is formed on a semiconductor substrate made of single crystal silicon.

The pixel cell array 20 includes the pixel cells 10 arranged in a matrix. As will be described in detail later, the pixel cells 10 each include an avalanche photodiode 1 (APD 1) and a plurality of transistors electrically connected to the APD 1.

The peripheral circuit section 30 is arranged around the pixel cell array 20, and includes a vertical scanning circuit 40, a read-out circuit 50, a horizontal scanning circuit 60, and a buffer amplifier 70. The peripheral circuit section 30 may include a circuit except these components.

The vertical scanning circuit 40 is a row selection circuit configured to operate a circuit inside each of the pixel cells 10 included in a selected one of rows. The vertical scanning circuit 40 allows a signal based on the charge generated in each of the APDs 1 included in the selected row to be output via a vertical signal line 9 (see FIG. 2) (in some cases, hereinafter referred to as the "VSL 9") to the read-out circuit 50.

The read-out circuit 50 includes a correlated double sampling circuit (in some cases, hereinafter referred to as the "CDS circuit") that removes a noise component included in the received signal. The read-out circuit 50 may incorporate another circuit.

The signal which has been transferred to the read-out circuit 50 and from which the noise component has been removed is transferred to the buffer amplifier 70 through driving of the horizontal scanning circuit 60, and is then output to a signal processing circuit in a subsequent stage (not shown). The signal that has undergone signal processing, such as white balance, in the signal processing circuit is transferred to a display (not shown), a memory (not shown), and any other component. Thus, light received by the pixel cell array 20 is, for example, imaged.

[Configuration of Pixel Cell]

Figure 2:
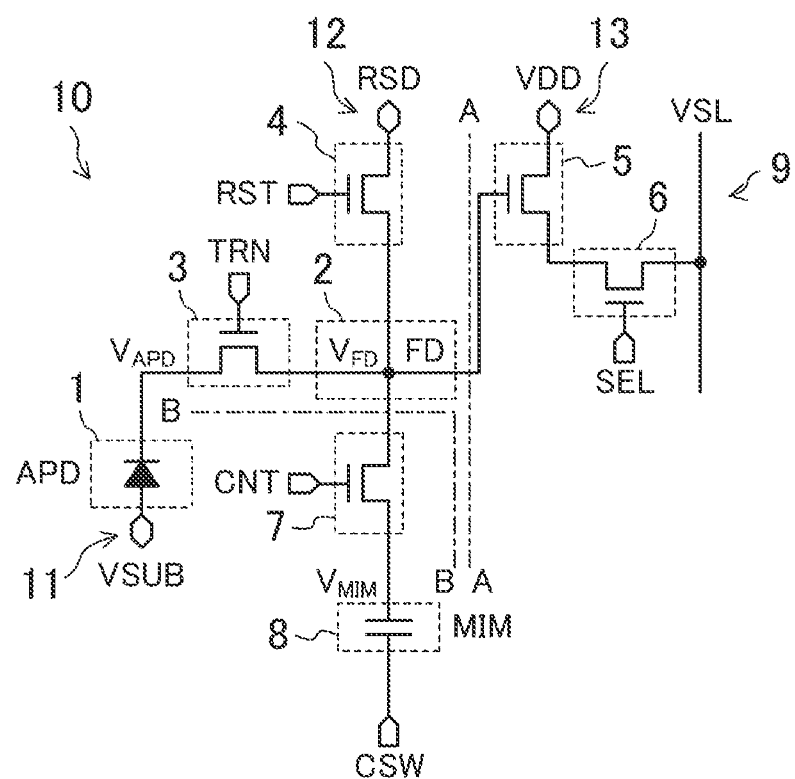
FIG. 2 is a schematic configuration diagram of a circuit in a pixel cell.
Figure 3:
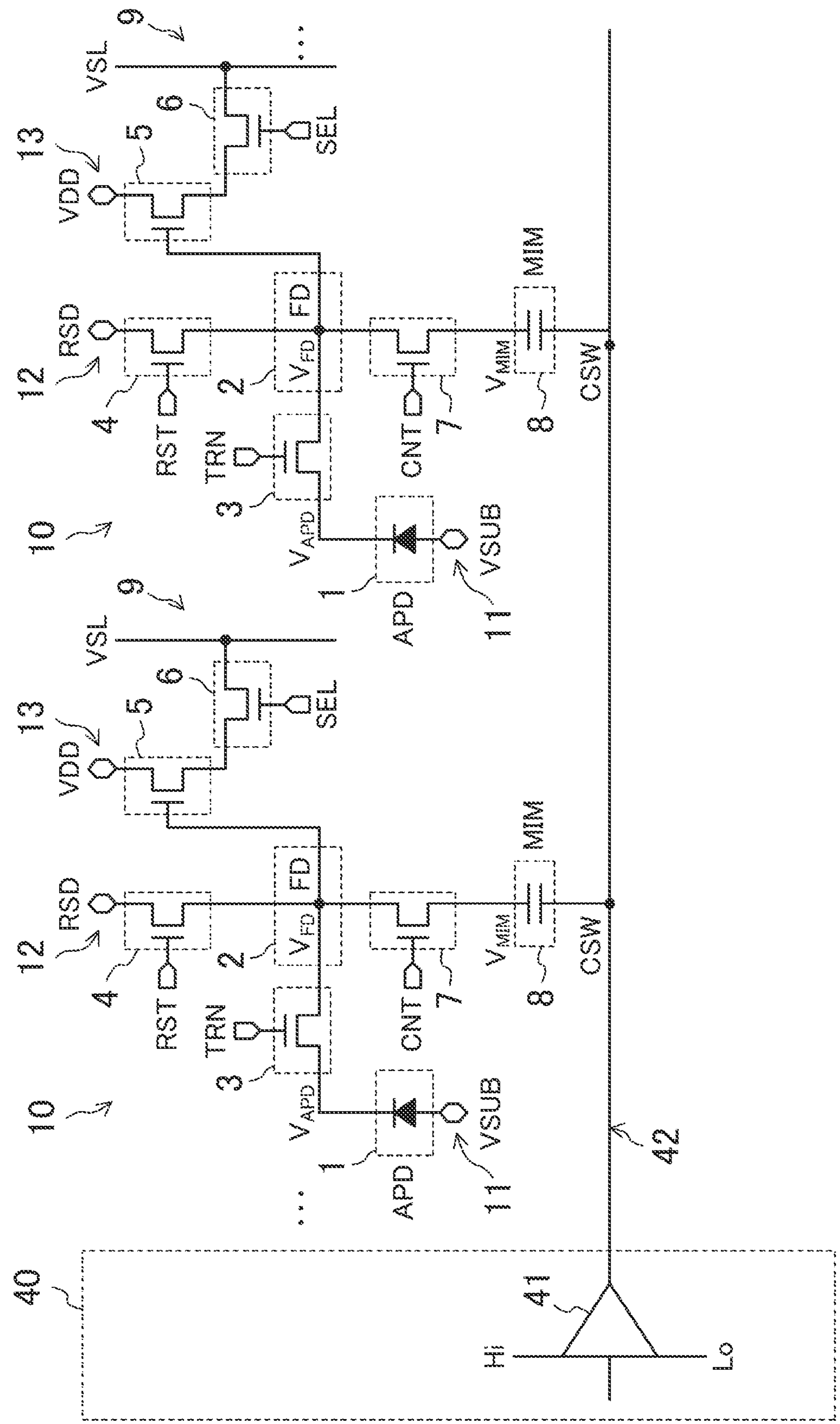
FIG. 3 is a schematic configuration diagram showing the relationship of connection between pixel cells and a circuit that applies a voltage to capacitors.

FIG. 2 shows a schematic configuration diagram of a circuit in a pixel cell, and FIG. 3 shows a schematic configuration diagram of the relationship of connection between pixel cells and a circuit that applies a voltage to capacitors.

As shown in FIG. 2, each pixel cell 10 includes the APD 1, a transfer transistor 3 (in some cases, hereinafter referred to as the "TRN-TR 3"), and a reset transistor 4 (in some cases, hereinafter referred to as the "RST-TR 4"). The pixel cell 10 further includes a floating diffusion portion 2 (in some cases, hereinafter referred to as the "FD portion 2"), a count transistor 7 (in some cases, hereinafter referred to as the "CNT-TR 7"), and a capacitor 8 (in some cases, hereinafter referred to as the "MIM 8"). The pixel cell 10 still further includes an amplifier transistor 5 (in some cases, hereinafter referred to as the "SF-TR 5"), and a selection transistor 6 (in some cases, hereinafter referred to as the "SEL-TR 6"). In the following description, if attention is given to a circuit operation, elements in the pixel cell 10 may be collectively referred to as a "pixel circuit."

The APD 1 is a silicon diode having a pn junction therein, and is operated with a voltage VSUB applied from a power supply 11 to its anode. The APD 1 is configured such that setting the voltage VSUB to be negative causes the pn junction to be reversely biased. If the absolute value of the voltage VSUB is less than a predetermined value (e.g., about −25 V), charge substantially proportional to the number of photons incident on the APD 1 generates in the APD 1 by photoelectric conversion. That is to say, in this case, the APD 1 operates in the same manner as a typical image sensor.

On the other hand, if the absolute value of the voltage VSUB is greater than the predetermined value (e.g., about −27 V), the number of carriers of the charge which has generated through photoelectric conversion and which reaches the pn junction by drift is multiplied by avalanche multiplication. The multiplication factor is usually set to be about several times to about 100,000 times.

The operation mode in the former case may be referred to as the "linear multiplication mode," and the operation mode in the latter case may be referred to as the "Geiger multiplication mode." The Geiger multiplication mode is more suitable for detecting feeble light with high sensitivity. Thus, a case where the operation mode of the APD 1 is the Geiger multiplication mode will be hereinafter described as an example. The absolute value of the voltage VSUB in a case where switching is made between the linear multiplication mode and the Geiger multiplication mode is not particularly limited to the above-described value. The absolute value can be appropriately changed in accordance with the concentration of impurities inside the APD 1, the size of the APD 1, and other elements. As will be described later, the operation mode of the APD 1 may be the linear multiplication mode.

The TRN-TR 3 is a field effect transistor (in some cases, hereinafter referred to as the "MISFET") with a source and a drain connected to the cathode of the APD 1 and the FD portion 2, respectively. In this embodiment, the drain of the TRN-TR 3 and the FD portion 2 are shared. The TRN-TR 3 is an N-channel MISFET. That is to say, the source and the drain being are n-type impurity regions, and a region directly below a gate is a p-type impurity region. The gate of the TRN-TR 3 is connected to the vertical scanning circuit 40. A driving signal TRN is supplied from the vertical scanning circuit 40 to the TRN-TR 3, which is thus turned on. As a result, the source and drain of the TRN-TR 3 are electrically connected together. This enables transfer of the charge that has generated in the APD 1 to the FD portion 2. The charge that has generated in the APD 1 in this case is charge which has generated by photoelectric conversion and which is further multiplied by avalanche multiplication.

The FD portion 2 is a region corresponding to the drain of the TRN-TR 3 and the source of the RST-TR 4. Although not shown, the FD portion 2 is an n-type impurity region formed on a portion of the surface of a p-type well. The electric potential of the p-type well is usually fixed. Thus, the electric potential of the FD portion 2 varies depending on the amount of charge stored in the FD portion 2.

The RST-TR 4 is an N-channel MISFET with a drain and a source connected to a reset drain power supply 12 (in some cases, hereinafter referred to as the "first power supply 12") and the FD portion 2, respectively. The gate of the RST-TR 4 is connected to the vertical scanning circuit 40. A driving signal RST is supplied from the vertical scanning circuit 40 to the RST-TR 4, which is thus turned on. Turning the RST-TR 4 on allows the FD portion 2 and the first power supply 12 to be electrically connected together. As a result, the electric potential of the FD portion 2 is initialized to a fixed voltage RSD applied from the first power supply 12 to the FD portion 2. In other words, the electric potential of the FD portion 2 is reset to the fixed voltage RSD. As will be described later, the driving signal RST applied from the vertical scanning circuit 40 to the gate of the RST-TRs 4 can have three different levels of voltage values. The power supply voltage of the first power supply 12 is applied to all of the RST-TRs 4 in the pixel cell array 20.

The SF-TR 5 is a MISFET with a drain and a gate connected to a drain power supply 13 (in some cases, hereinafter referred to as the "second power supply 13") and the FD portion 2, respectively. A voltage signal responsive to the amount of charge transferred from the APD 1 to the FD portion 2 and stored in the FD portion 2 is output to the source of the SF-TR 5. The charge stored in the FD portion 2 is stored in the MIM 8 via the CNT-TR 7. The magnitude of a signal output from the SF-TR 5 to the VSL 9 in a read-out step to be described later is substantially proportional to the amount of charge stored in the MIM 8 in a light exposure step to be described later via the FD portion 2 and the CNT-TR 7. The power supply voltage of the second power supply 13 is applied to all of the SF-TRs 5 in the pixel cell array 20.

The SEL-TR 6 is a MISFET with a drain and a source connected to the source of the SF-TR 5 and the VSL 9, respectively. The gate of the SEL-TR 6 is connected to the vertical scanning circuit 40. A driving signal SEL is supplied from the vertical scanning circuit 40 to the SEL-TR 6, which is thus turned on. As a result, the output signal from the SF-TR 5 is transferred to the VSL 9, and is further output to the read-out circuit 50.

The CNT-TR 7 is an N-channel MISFET with a drain and a source connected to the FD portion 2 and one of terminals of the MIM 8, respectively. The CNT-TR 7 is an enhancement MISFET. The gate of the CNT-TR 7 is connected to the vertical scanning circuit 40. A driving signal CNT is supplied from the vertical scanning circuit 40 to the CNT-TR 7, which is thus turned on. As a result, the charge stored in the FD portion 2 is stored in the MIM 8 via the CNT-TR 7.

The MIM 8 is a capacitor element consisting of upper and lower electrodes (not shown) and a dielectric film (not shown) interposed therebetween. As shown in FIG. 3, the one of the terminals of the MIM 8 is connected to the source of the CNT-TR 7, and the other terminal is connected to a capacitor signal line 42. Here, the one of the terminals corresponds to the lower electrode, and the other terminal corresponds to the upper electrode.

The MIMs 8 included in the same row are connected to the same capacitor signal line 42. An amplifier 41 is connected to the capacitor signal line 42. The amplifier 41 is a circuit inside the vertical scanning circuit 40, and generates different levels of voltage signals in response to a predetermined input signal. A driving signal CSW, which is an output signal from the amplifier 41, is applied to the other terminal of each of the MIMs 8. For example, the amplifier 41 is configured such that the driving signal CSW can be at one of two levels, i.e., a Lo signal serving as a voltage signal corresponding to the ground potential or a Hi signal having a higher voltage than the Lo signal does. The Hi signal applied to the other terminal of each MIM 8 lowers the electric potential ($V_{MIM}$) of the source of the CNT-TR 7 connected to the one terminal of the MIM 8 (see FIG. 6E).

Although not shown, the gates of the TRN-TRs 3 included in the same row are connected to a transfer row signal line (not shown), and the driving signal TRN is supplied via the transfer row signal line to the TRN-TRs 3 at the same timing. Likewise, the gates of the RST-TRs 4 included in the same row are connected to a reset row signal line (not shown), and the driving signal RST is supplied via the reset row signal line to the RST-TRs 4 at the same timing. The gates of the SEL-TRs 6 included in the same row are connected to a selection row signal line (not shown), and the driving signal SEL is supplied via the selection row signal line to the SEL-TRs 6 at the same timing. The gates of the CNT-TRs 7 included in the same row are connected to a count row signal line (not shown), and the driving signal CNT is supplied via the count row signal line to the CNT-TRs 7 at the same timing.

[Method For Driving Solid State Image Sensor During Photodetection]

Figure 4:
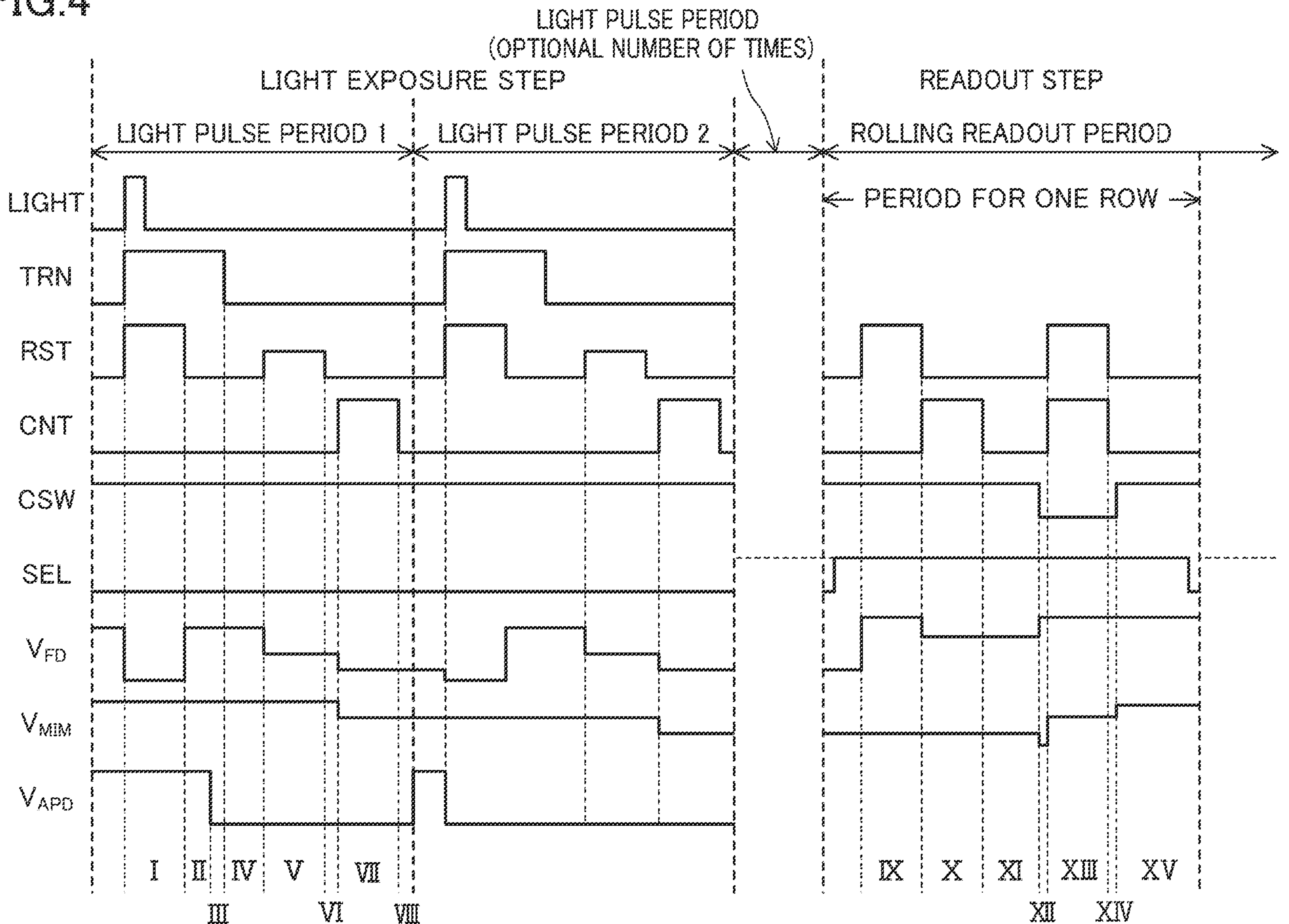
FIG. 4 is a timing chart showing operation timing of a pixel circuit.

FIG. 4 shows a timing chart of operation of a pixel circuit during photodetection. FIGS. 5A to 5H schematically show the electric potential and potential in a pixel cell during light exposure. FIGS. 6A to 6G schematically show the electric potential and potential in a pixel cell during signal read-out. An upper part of each of FIGS. 5A to 5H and 6A to 6G schematically shows the electric potential and potential along line A-A shown in FIG. 2, and a lower part thereof schematically shows the potential along line B-B shown in FIG. 2. In addition, the electric potentials and potentials shown in 5A to 5H correspond to the periods I to VIII shown in FIG. 4, respectively, and the electric potentials and potentials shown in 6A to 6G correspond to the periods IX to XV shown in FIG. 4, respectively.

In each of FIGS. 5A to 5H and 6A to 6G, the potential of each of the components of the pixel cell 10 is indicated by the electric potential. In this case, FIGS. 5A to 5H and 6A to 6G are each shown such that the electric potential satisfies the relationship "V1>V2>V3." In this embodiment, the electric potentials V1, V2, and V3 satisfy the relationships "V1=+3 V," "V2=0 V," and "V3=−1.1 V." However, this is merely an example. These values can be appropriately changed depending on the power supply voltages of the first and second power supplies 12 and 13 and the specifications of the elements in the pixel cell 10 (in particular, the sizes of the transistors).

In this embodiment, the main charge generating in the APD 1 and transferred to the FD portion 2 is electrons. Thus, for information, $E_c$ and $E_{FN}$ are indicated in each of the figures. $E_c$ shows the lowest level of the conduction band of the semiconductor layer forming components in the pixel cell 10. $E_{FN}$ shows the Fermi level of the n-type semiconductor layer constituting the components. The vertical axis also shows the potential energy of electrons in each component in the pixel cell 10. The magnitude of the potential energy of electrons is opposite to that of the electric potential. Thus, in each of the figures, the relationship "P3>P2>P1" is satisfied.

In each of FIGS. 5A to 5H and 6A to 6G, $V_{APD}$ shows the electric potential or potential of the cathode of the APD 1 (see FIG. 2). $V_{FD}$ shows the electric potential or potential of the FD portion 2 (see FIG. 2). $V_{MIM}$ shows the electric potential or potential of one of the terminals of the MIM 8 connected to the source of the CNT-TR 7 (see FIG. 2). P-well shows the electric potential or potential of a p-type well (not shown) surrounding the FD portion 2. The electric potential is fixed to V3 (=−1.1 V). RSD shows the electric potential or potential of the drain of the RST-TR 4. The electric potential is fixed to the power supply voltage of the first power supply 12 (in this case, +3 V).

TRN shows the electric potential of the gate of the TRN-TR 3, and its value corresponds to the voltage value of the driving signal TRN. CNT shows the electric potential of the gate of the CNT-TR 7, and its value corresponds to the voltage value of the driving signal CNT. RST shows the electric potential of the gate of the RST-TR 4, and its value corresponds to the voltage value of the driving signal RST.

As shown in FIG. 4, executing the light exposure step and the subsequent read-out step allows the solid state image sensor 100 to output a signal based on photons incident on the APD 1. From a different point of view, the number of times photons are incident on the APD 1 is detected. The light exposure step is executed through a plurality of repetitions of a light exposure period having a predetermined length. As will be described later in detail, the magnitude of the output signal finally output from the solid state image sensor 100 is proportional to the number of times of the light exposure period during which photons are incident on the APD 1. In addition, in the read-out step, so-called "rolling read-out" is executed in which signals are sequentially read out on a row-by-row basis of the pixel cell array 20.

Figure 5A:
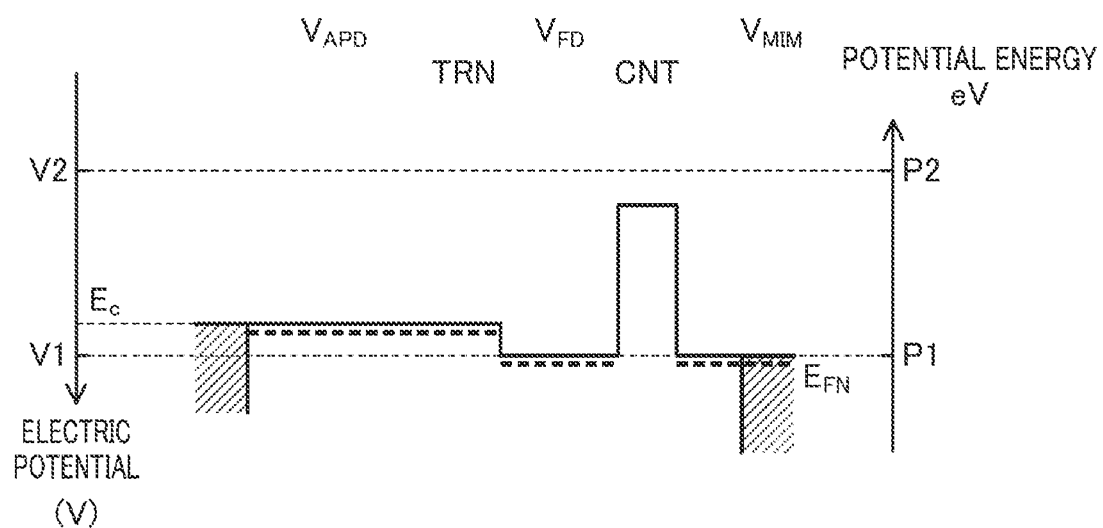
FIG. 5A shows schematic diagrams of the electric potential and potential in a pixel cell during a period I in FIG. 4.
Figure 5A:
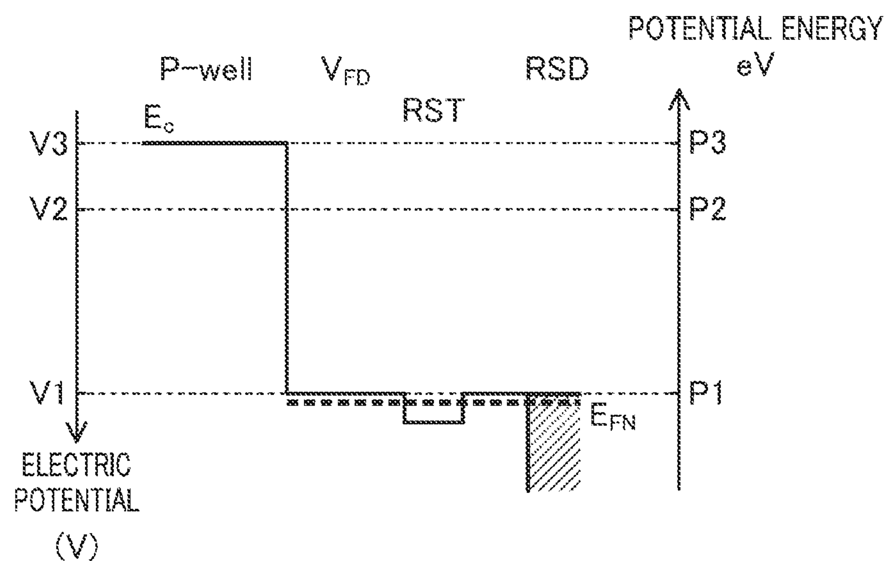

During one light exposure period, such as during a light pulse period 1 shown in FIG. 4, attention is paid to a case where photons are incident on the APD 1. First, as shown in FIG. 5A, the driving signal RST (=+4 V) is applied to the gate of the RST-TR 4 to turn the RST-TR 4 on (the period I shown in FIG. 4). At the same time, the driving signal TRN(=+3 V) is applied to the gate of the TRN-TR 3 to turn the TRN-TR 3 on. This triggers application of the power supply voltage RSD (=+3 V) of the first power supply 12 to the source of the APD 1 and the FD portion 2. Thus, $V_{APD}$ and $V_{FD}$ are reset to an initialization potential (+3 V).

Figure 5B:
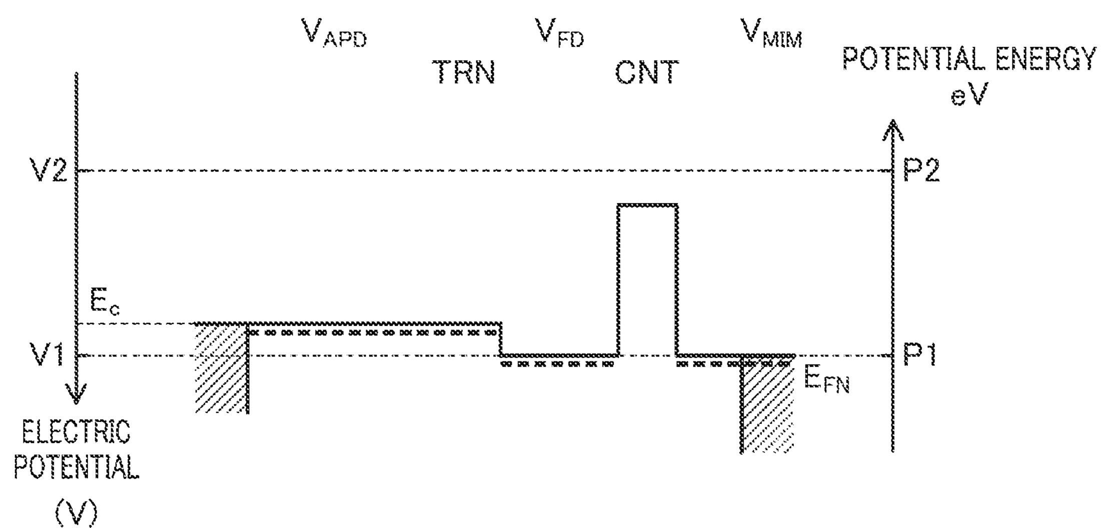
FIG. 5B shows schematic diagrams of the electric potential and potential in the pixel cell during a period II in FIG. 4.
Figure 5B:
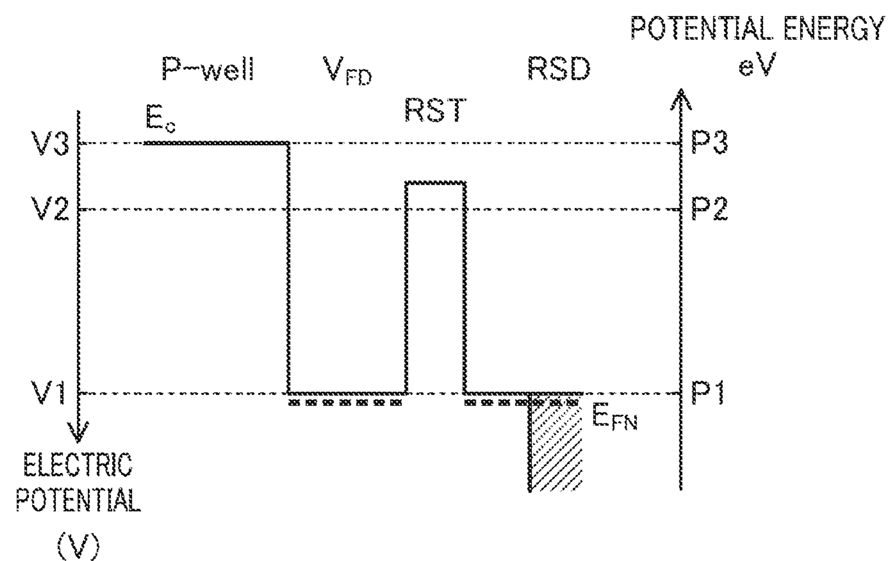
Figure 5C:
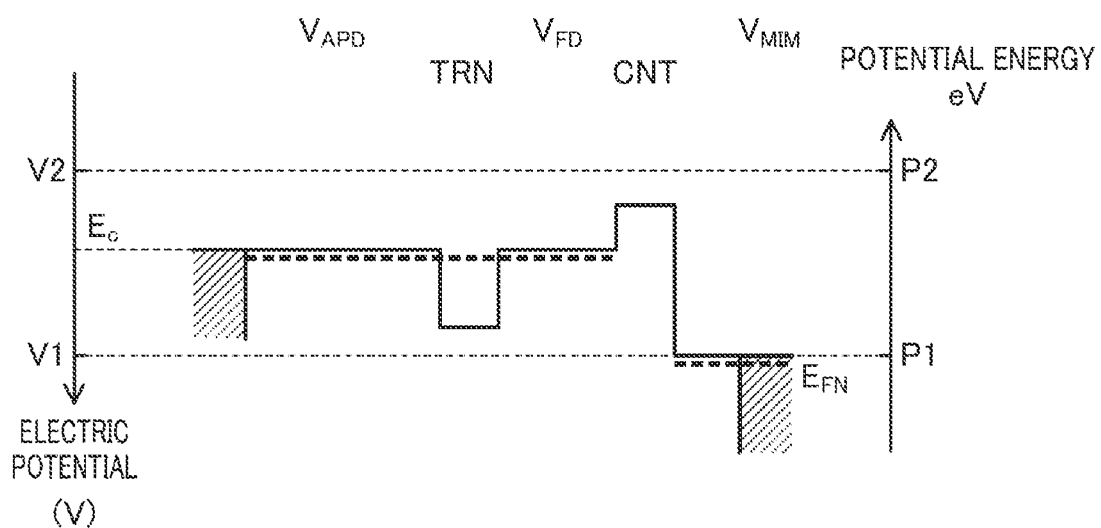
FIG. 5C shows schematic diagrams of the electric potential and potential in the pixel cell during a period III in FIG. 4.
Figure 5C:
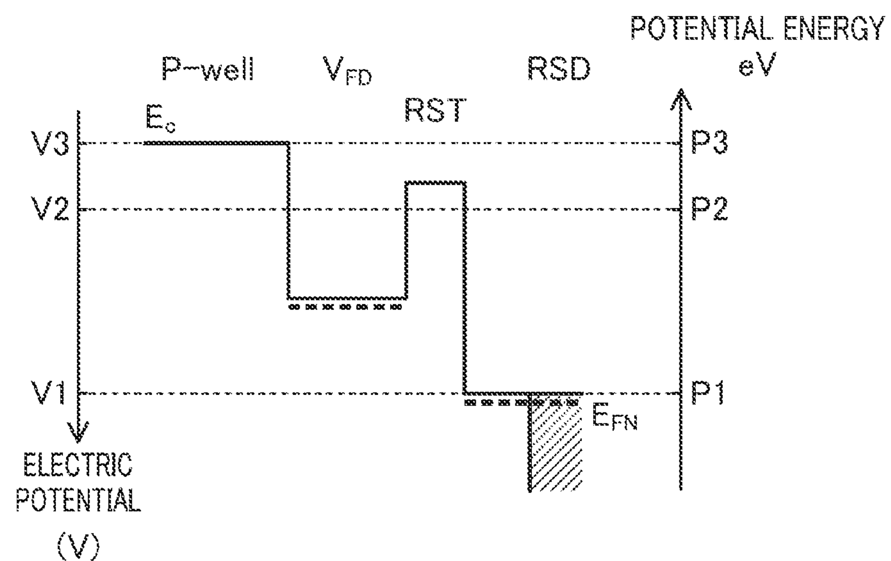

Next, as shown in FIG. 5B, the driving signal RST is reduced to 0 V to turn the RST-TR 4 off (the period II shown in FIG. 4). In contrast, the TRN-TR 3 maintains its on state, and the pixel cell 10 is exposed to light. The electrons that have generated in the APD 1 by avalanche multiplication reduce the electric potential $V_{APD}$ (increases the associated potential). The electrons further flow through the TRN-TR 3 into the FD portion 2. This reduces the electric potential $V_{FD}$ (increases the associated potential) (see FIG. 5C; the period III shown in FIG. 4).

Figure 5D:
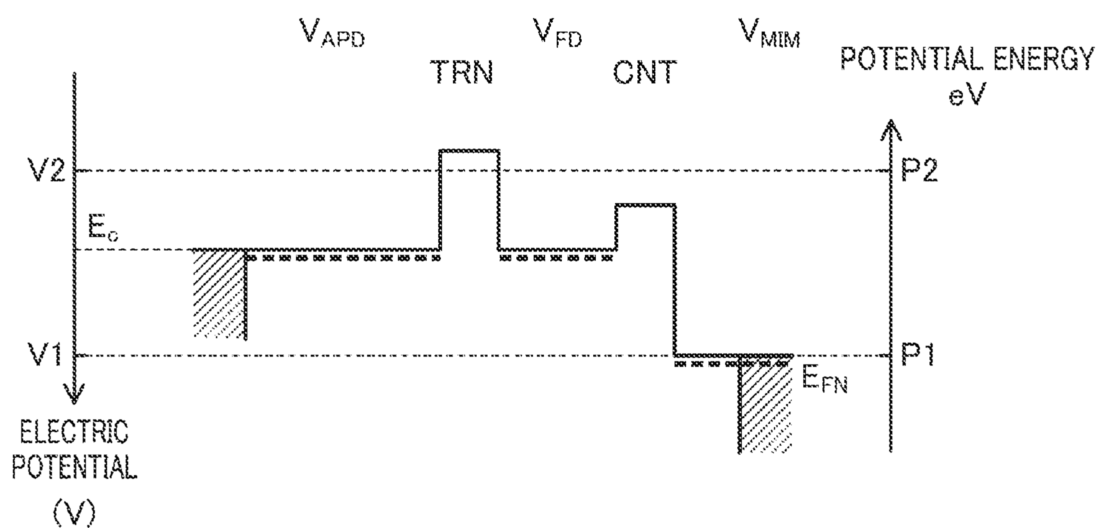
FIG. 5D shows schematic diagrams of the electric potential and potential in the pixel cell during a period IV in FIG. 4.
Figure 5D:
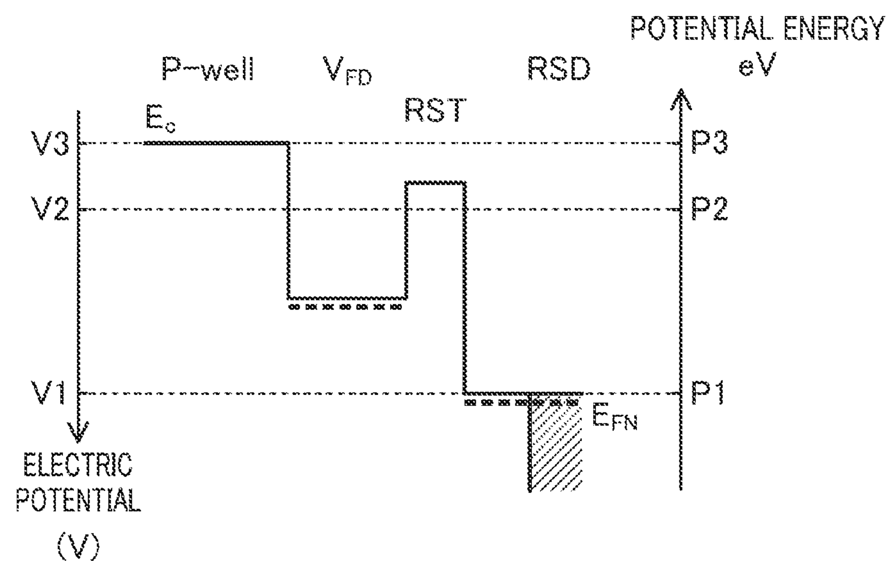

As shown in FIG. 5D, the driving signal TRN is reduced to 0 V to turn the TRN-TR 3 off, thereby ending light exposure (the period IV shown in FIG. 4).

Figure 5E:
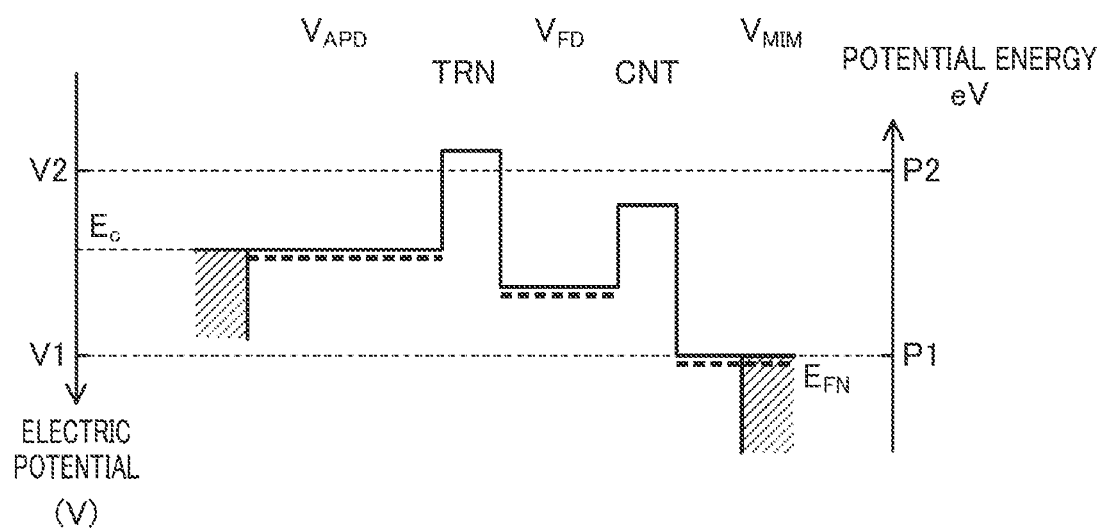
FIG. 5E shows schematic diagrams of the electric potential and potential in the pixel cell during a period V in FIG. 4.
Figure 5E:
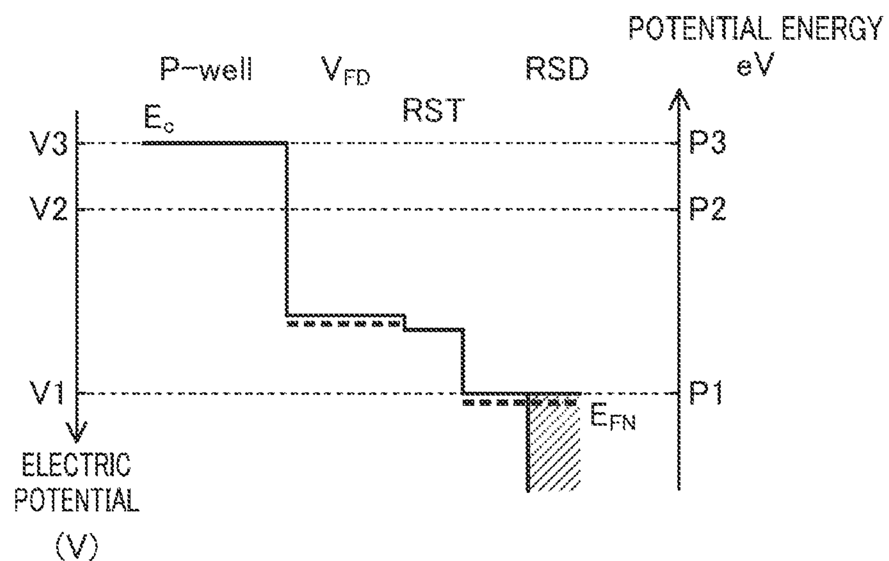
Figure 5F:
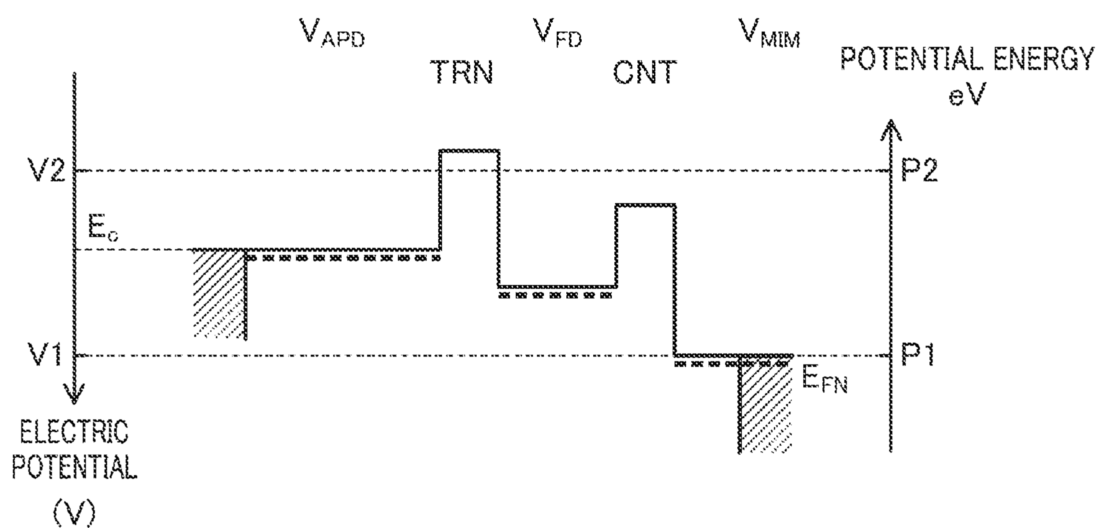
FIG. 5F shows schematic diagrams of the electric potential and potential in the pixel cell during a period VI in FIG. 4.
Figure 5F:
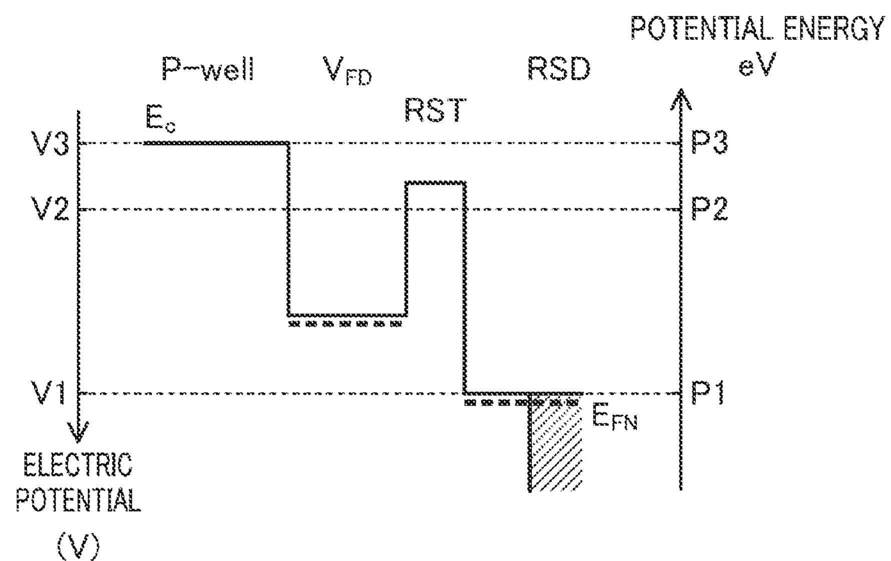

Next, as shown in FIG. 5E, the driving signal RST is applied to the gate of the RST-TR 4 so that the electric potential RST has a value between the values V1 and V2 (the period V shown in FIG. 4). The magnitude of the driving signal RST in this case is +2.5 V. This allows the potential directly below the gate of the RST-TR 4 to be at a level between the potentials of the source and drain of the RST-TR 4. In this case, although the RST-TR 4 is not completely turned on, electrons can flow from the FD portion 2 to the first power supply 12. The amount of charge stored in the FD portion 2 and, in turn the electric potential $V_{FD}$ vary depending on variations in the amount of charge that has generated in the APD 1. Meanwhile, if the step shown in FIG. 5E is performed to allow the FD portion 2 to be electrically connected to the first power supply 12 with reliability, the electric potential $V_{FD}$ is adjusted so as to be made uniform at a predetermined level. Furthermore, as shown in FIG. 5F, the driving signal RST is reduced to 0 V to turn the RST-TR 4 off, thereby ending the adjustment of the electric potential $V_{FD}$ (the period VI shown in FIG. 4).

Figure 5G:
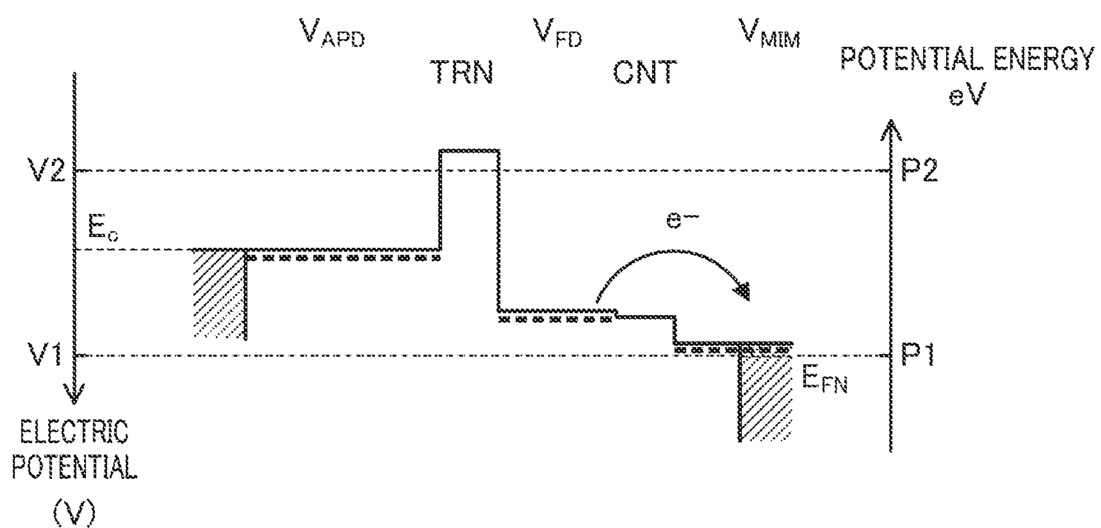
FIG. 5G shows schematic diagrams of the electric potential and potential in the pixel cell during a period VII in FIG. 4.
Figure 5G:
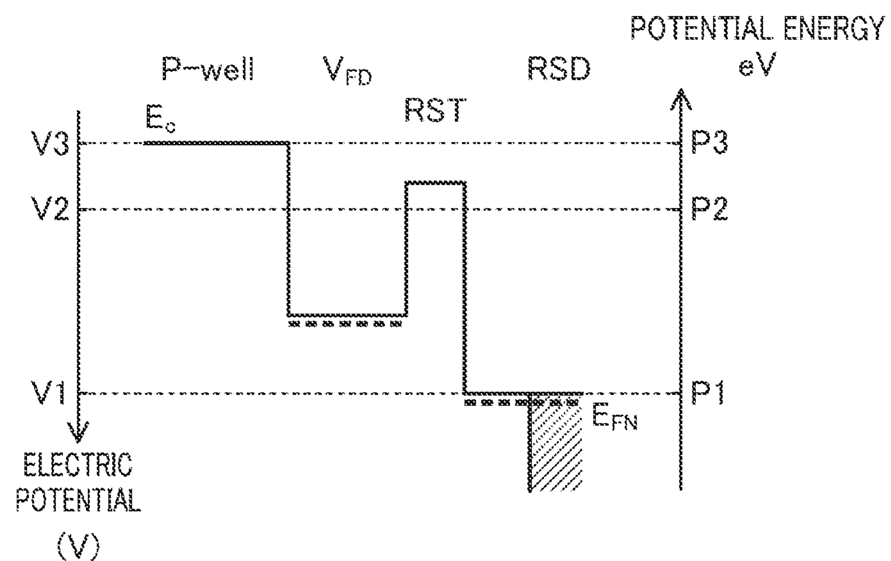

As shown in FIG. 5G, the driving signal CNT (=+3 V) is applied to the gate of the CNT-TR 7 to turn the CNT-TR 7 on (the period VII shown in FIG. 4). This allows electrons stored in the FD portion 2 to flow into the MIM 8.

Figure 5H:
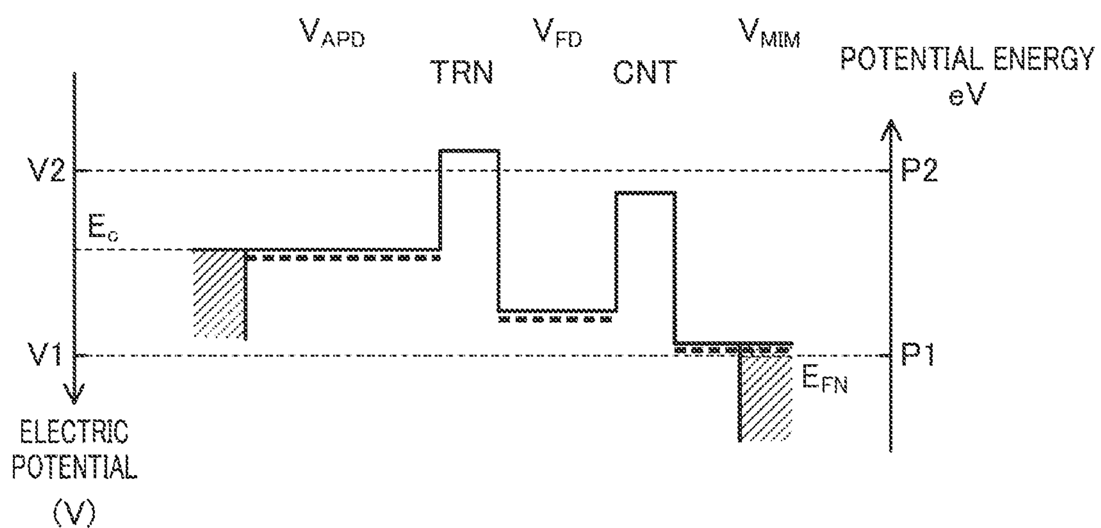
FIG. 5H shows schematic diagrams of the electric potential and potential in the pixel cell during a period VIII in FIG. 4.
Figure 5H:
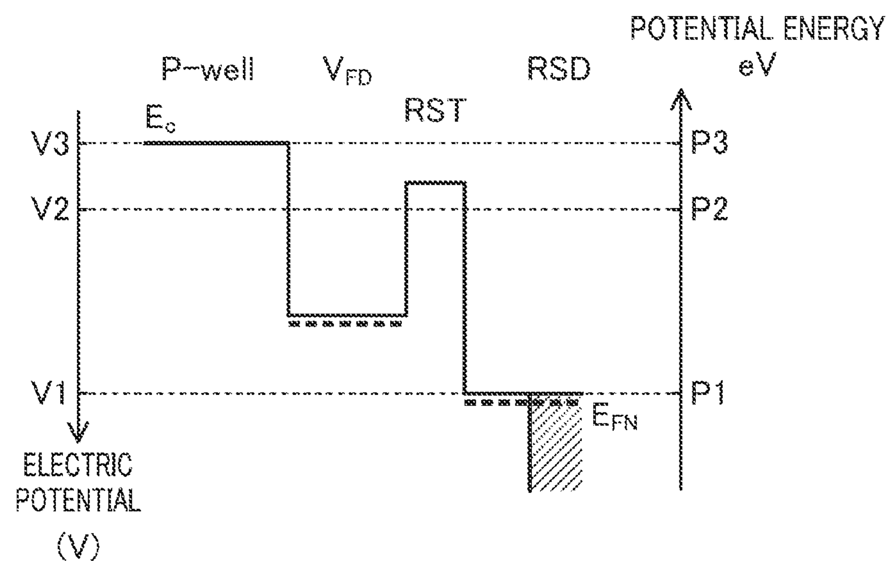

Finally, as shown in FIG. 5H, the driving signal CNT is reduced to 0 V to turn the CNT-TR 7 off, thereby ending the light pulse period 1 (the period VIII shown in FIG. 4). In this state, a predetermined amount of electrons are stored and retained in the MIM 8.

As shown in FIG. 4, the sequence shown in FIGS. 5A to 5G is repeatedly executed also during the next light pulse period 2 and a light exposure period subsequent to the light pulse period 2. However, if no photon is incident on the APD1 during one light exposure period, electrons do not generate in the APD 1 by avalanche multiplication. Thus, electrons are not stored in the MIM 8 during the one light exposure period. In the light exposure step, the driving signal CSW is fixed at the Hi signal.

Figure 6A:
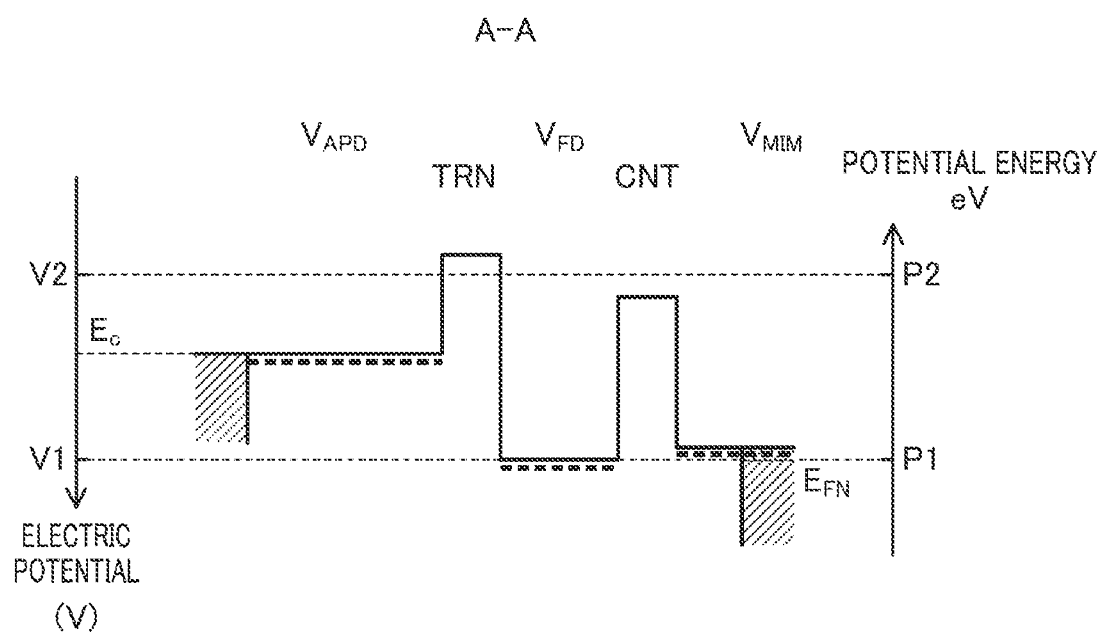
FIG. 6A shows schematic diagrams of the electric potential and potential in the pixel cell during a period IX in FIG. 4.
Figure 6A:
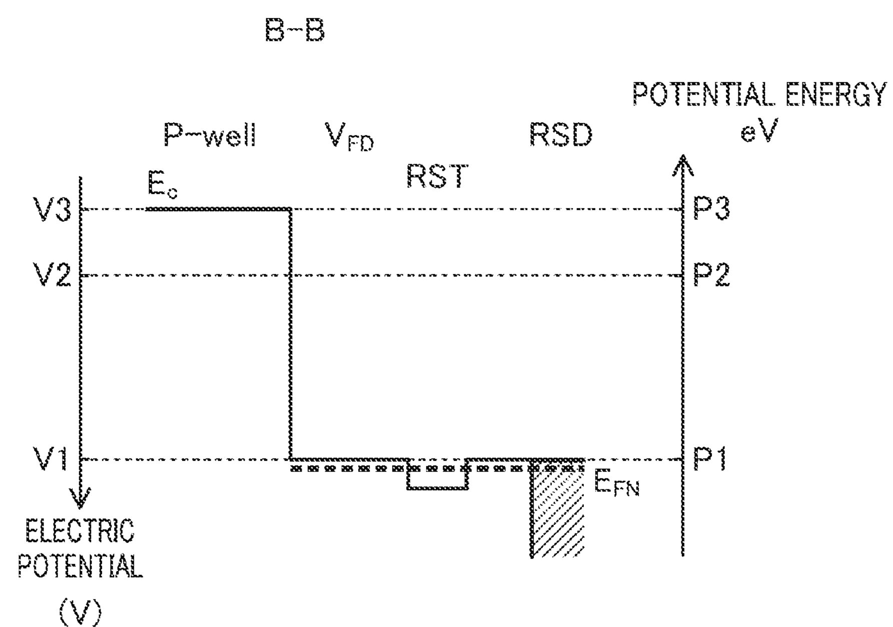

After the light exposure period is repeated the predetermined number of times, a photodetection signal is read out from the solid state image sensor 100. First, as shown in FIG. 4, the driving signal SEL is applied to the gate of the SEL-TR 6 to turn the SEL-TR 6 on. First, as shown in FIG. 6A, the driving signal RST (=+4 V) is applied to the gate of the RST-TR 4 to turn the RST-TR 4 on, and the electric potential $V_{FD}$ is reset to the initialization potential (+3 V) (the period IX shown in FIG. 4).

Figure 6B:
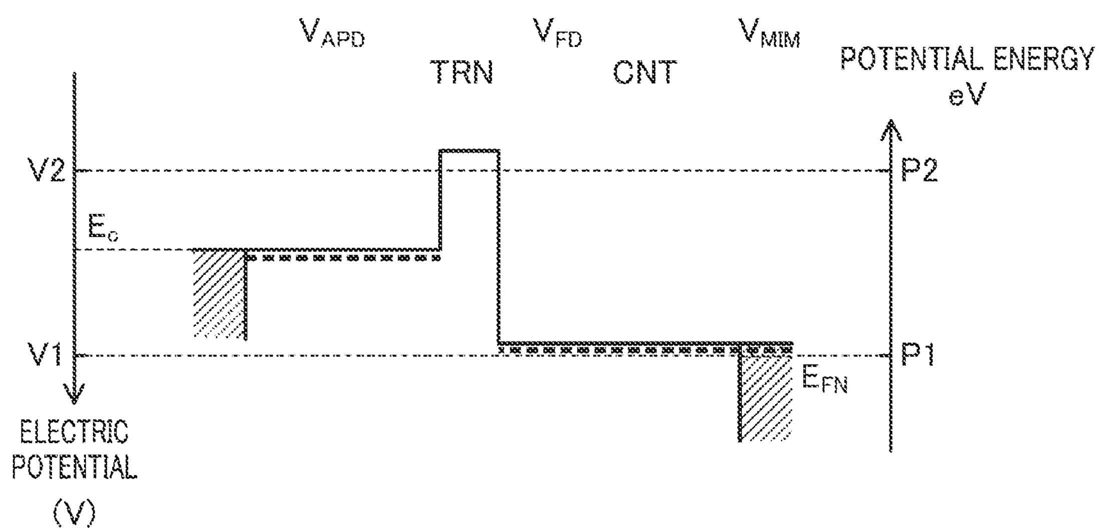
FIG. 6B shows schematic diagrams of the electric potential and potential in the pixel cell during a period X in FIG. 4.
Figure 6B:
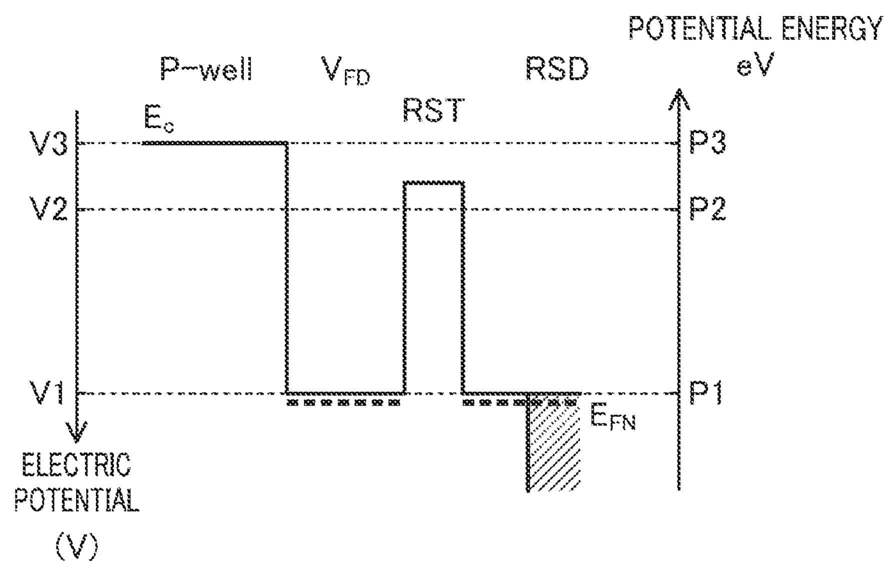

Next, as shown in FIG. 6B, the driving signal RST is reduced to 0 V to turn the RST-TR 4 off. At the same time, the driving signal CNT (=+3 V) is applied to the gate of the CNT-TR 7 to turn the CNT-TR 7 on (the period X shown in FIG. 4). This allows the charge stored in the MIM 8 to be transferred to the FD portion 2.

Figure 6C:
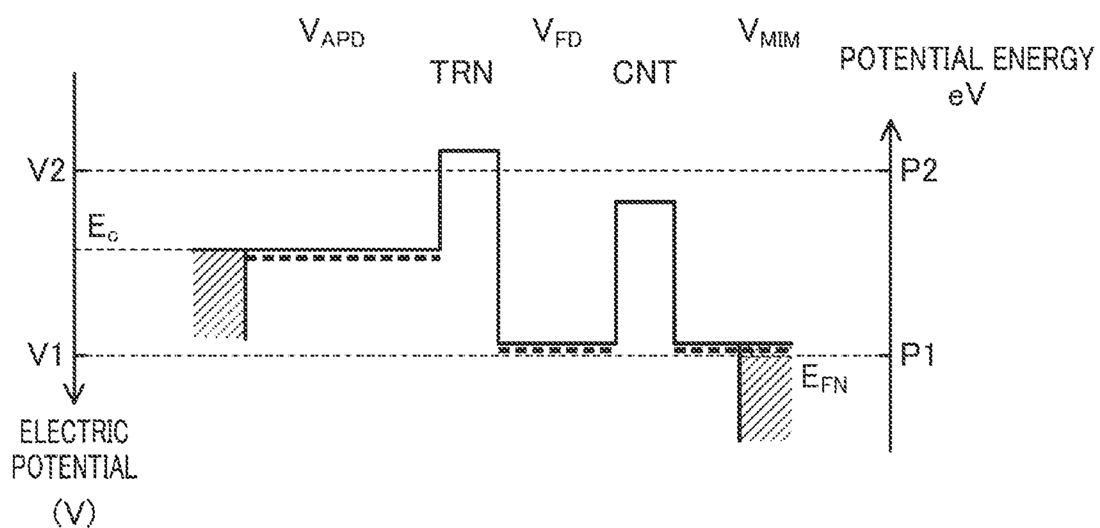
FIG. 6C shows schematic diagrams of the electric potential and potential in the pixel cell during a period XI in FIG. 4.
Figure 6C:
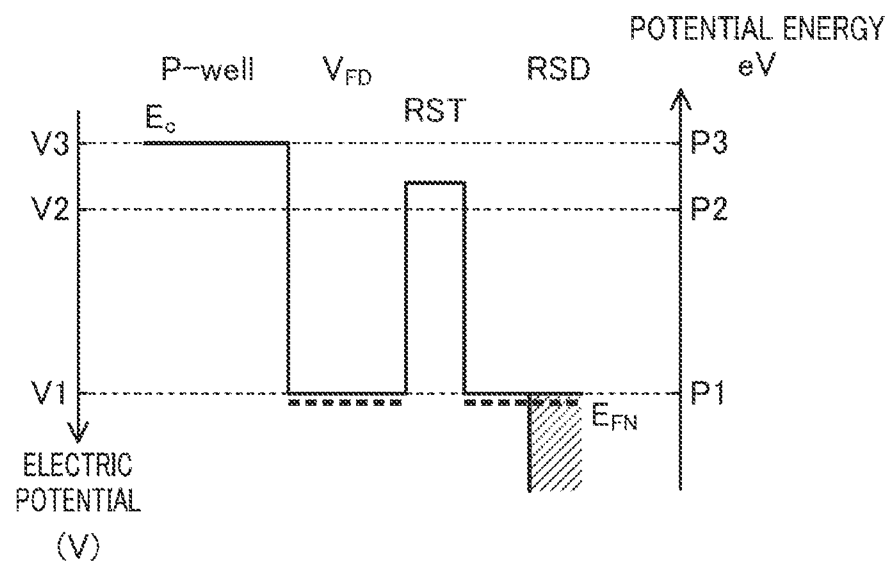

Furthermore, as shown in FIG. 6C, the driving signal CNT is reduced to 0 V to turn the CNT-TR 7 off (the period XI shown in FIG. 4). This allows a voltage signal based on the amount of charge stored in the FD portion 2 to be output from the SF-TR 5 and to be then transferred through the SEL-TR 6 to the VSL 9.

Figure 6D:
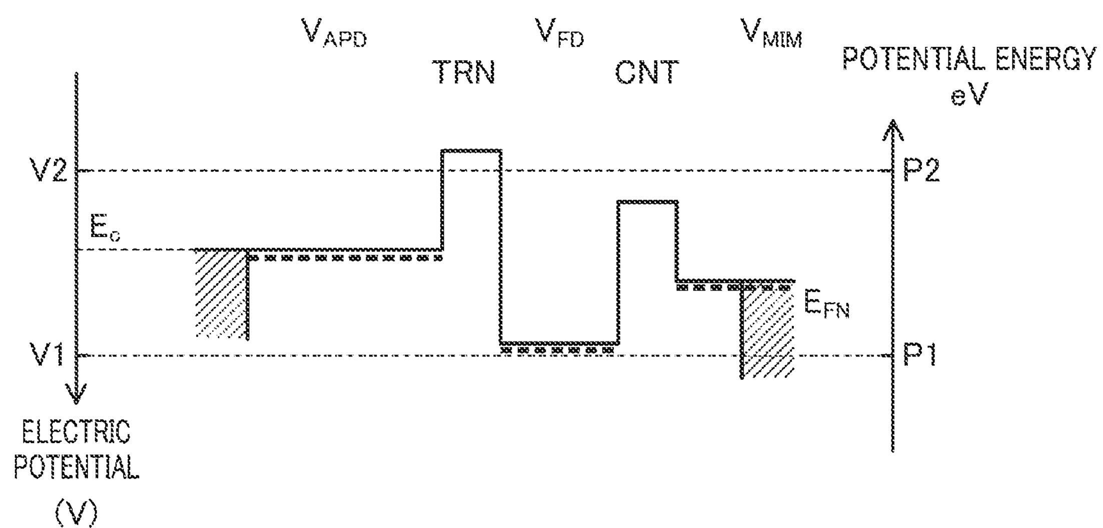
FIG. 6D shows schematic diagrams of the electric potential and potential in the pixel cell during a period XII in FIG. 4.
Figure 6D:
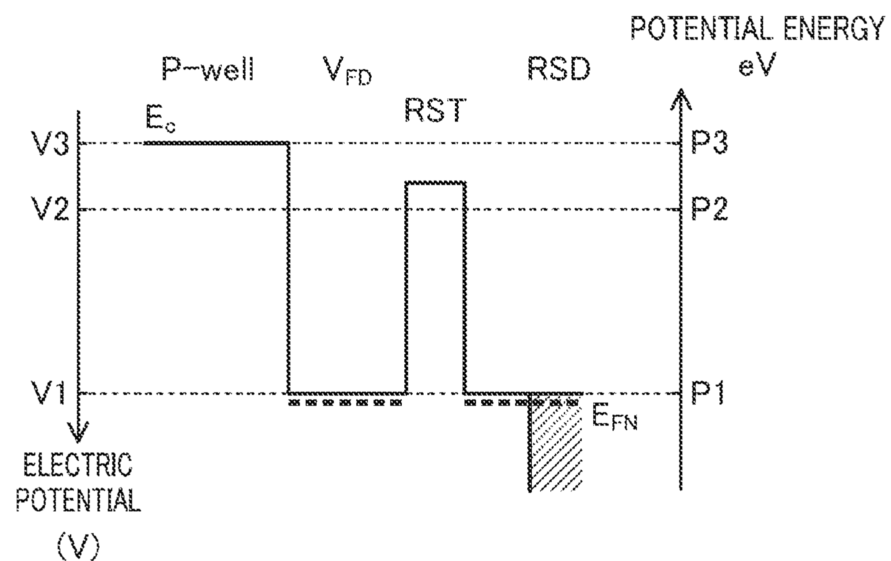

Next, as shown in FIG. 6D, the driving signal CSW is changed to the Lo signal (the period XII shown in FIG. 4). This reduces the electric potential $V_{MIM}$ (increases the associated potential).

Figure 6E:
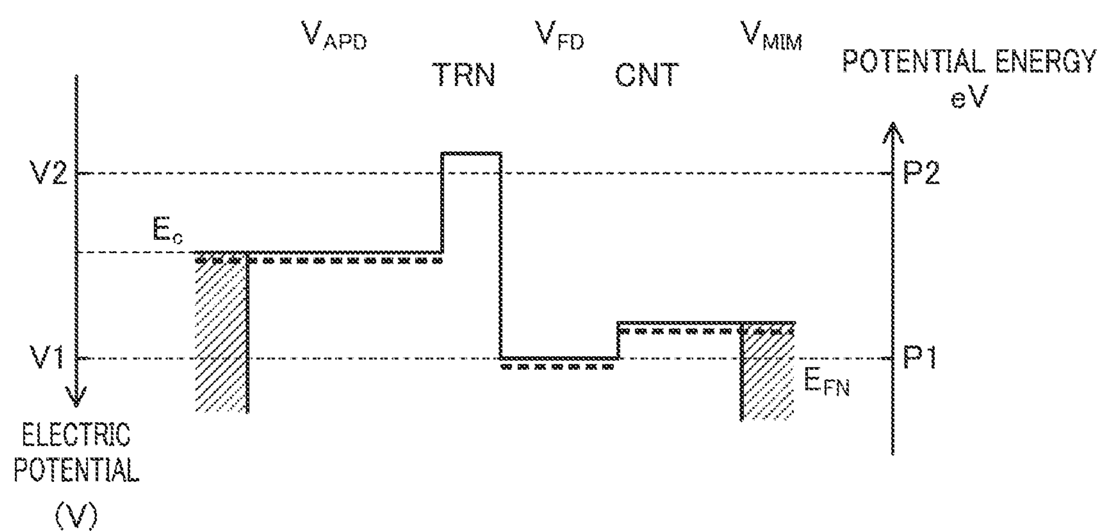
FIG. 6E shows schematic diagrams of the electric potential and potential in the pixel cell during a period XIII in FIG. 4.
Figure 6E:
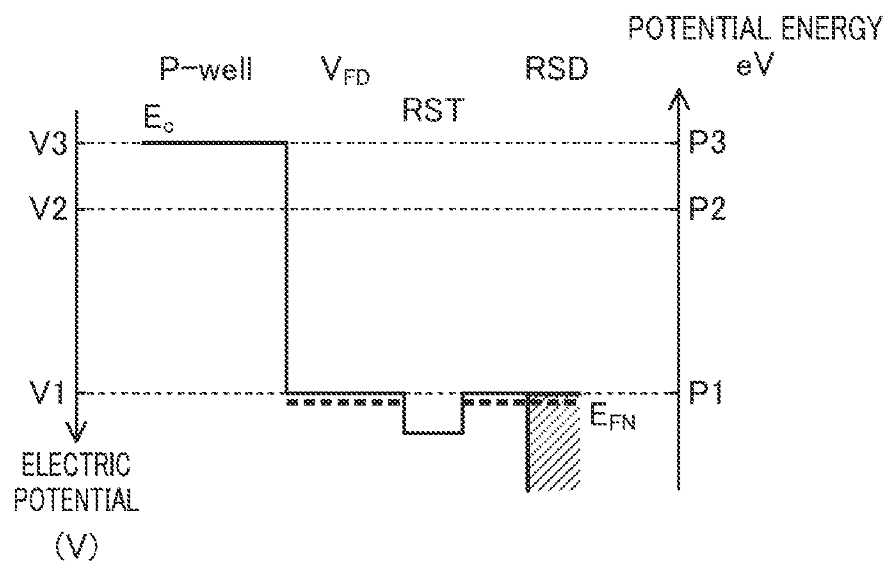

As shown in FIG. 6E, the driving signal CNT (=+3 V) is applied to the gate of the CNT-TR 7 to turn the CNT-TR 7 on. At the same time, the driving signal RST (=+4 V) is applied to the gate of the RST-TR 4 to turn the RST-TR 4 on (the period XII shown in FIG. 4). This allows the electric potentials $V_{MIM}$ and $V_{FD}$ to be initialized and reset.

Figure 6F:
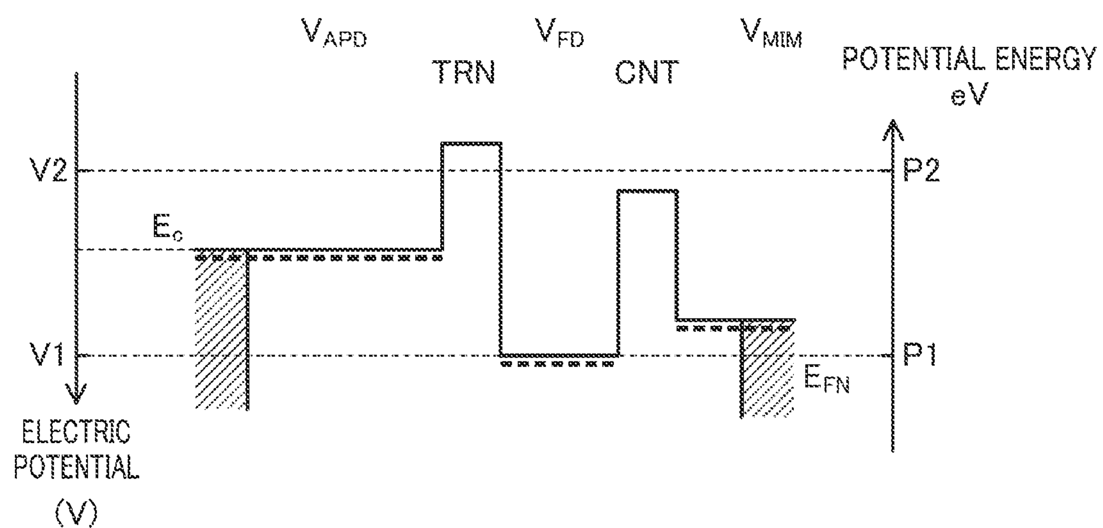
FIG. 6F shows schematic diagrams of the electric potential and potential in the pixel cell during a period XIV in FIG. 4.
Figure 6F:
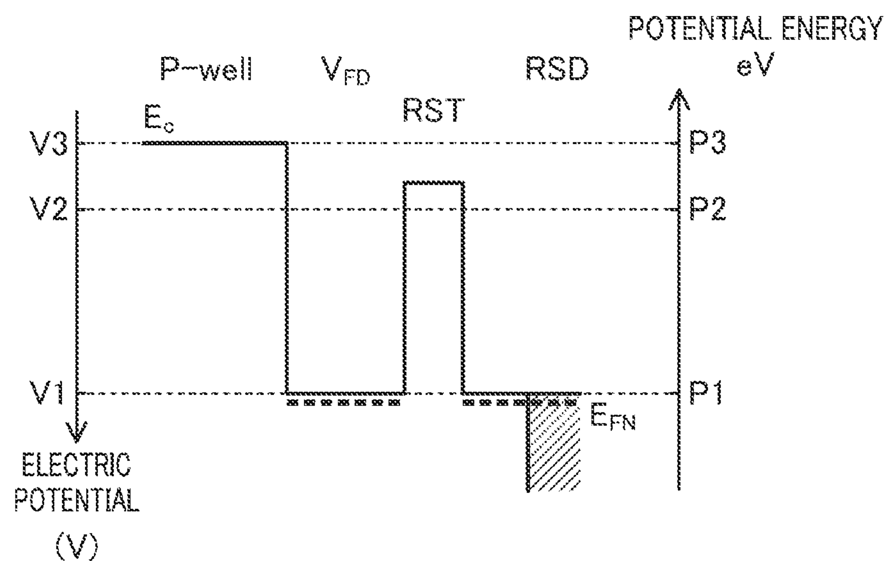

As shown in FIG. 6F, the driving signal CNT is reduced to 0 V to turn the CNT-TR 7 off (the period XIII shown in FIG. 4), thereby ending the resetting of the electric potentials $V_{MIM}$ and $V_{FD}$.

Figure 6G:
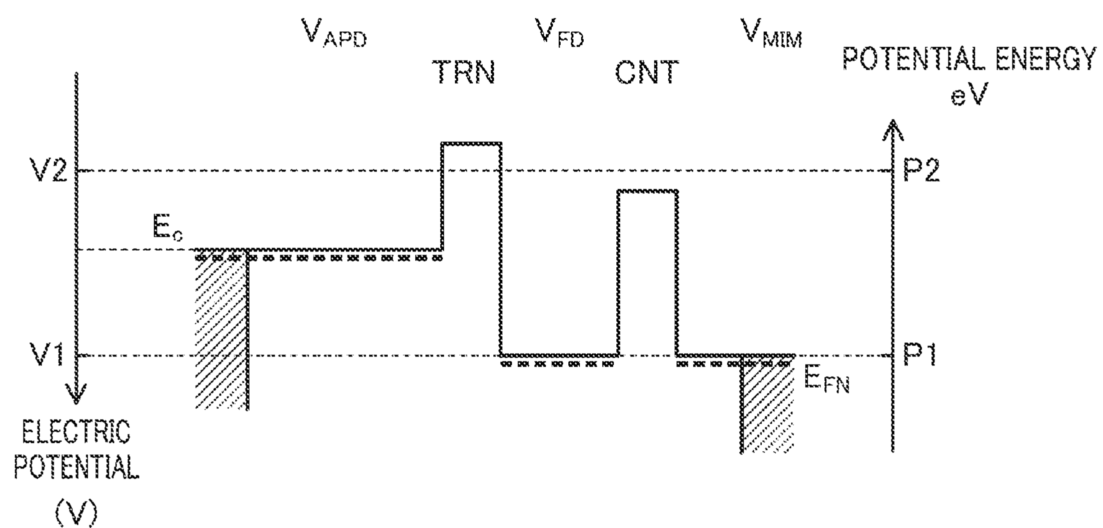
FIG. 6G shows schematic diagrams of the electric potential and potential in the pixel cell during a period XV in FIG. 4.
Figure 6G:
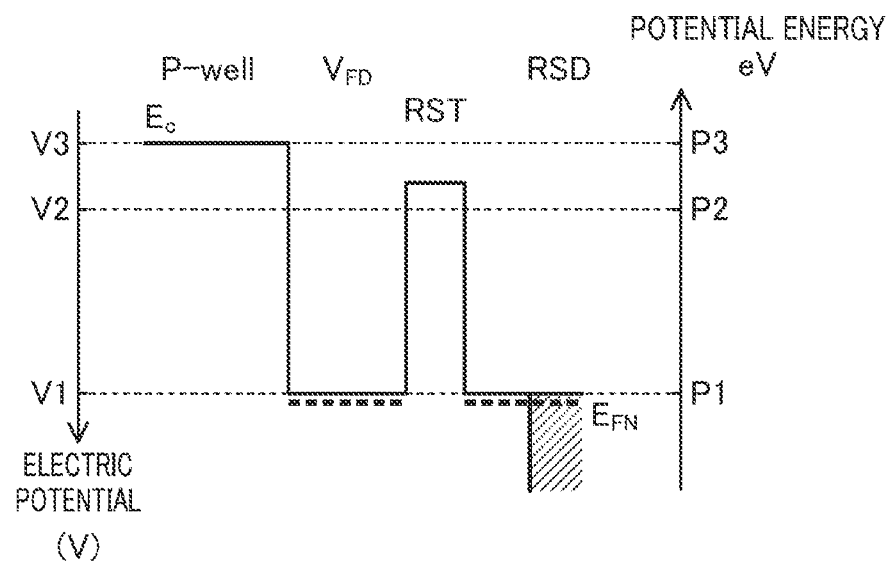

As shown in FIG. 6G, the driving signal CSW is changed to the Hi signal (the period XIV shown in FIG. 4). At this point in time, a voltage signal based on the amount of charge stored in the FD portion 2 is output from the SF-TR 5, and is then transferred through the SEL-TR 6 to the VSL 9.

The voltage signal output to the VSL 9 during the period XI is determined to be the signal level, and the voltage signal output to the VSL 9 during the period XIV is determined to be the reset level. These two signals are sequentially input to the CDS circuit connected to the VSL 9, thereby generating the photodetection signal from which a noise component has been removed.

[Relationship between Count and Electric Potential Stored in Capacitor]

Figure 7:
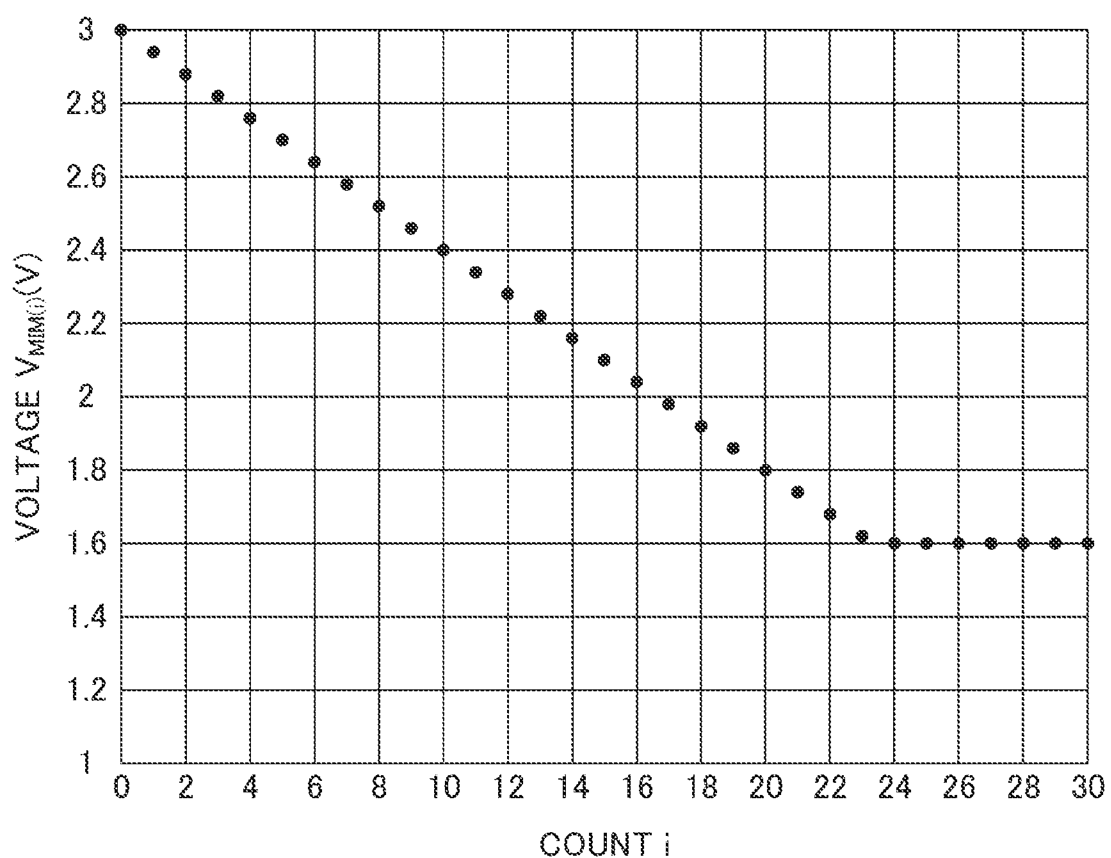
FIG. 7 shows an example of the relationship between the photon count and the capacitor voltage in a light exposure step.

FIG. 7 shows an example of the relationship between the photon count and the capacitor voltage in the light exposure step.

As described above, the electric potential $V_{FD}$ of the FD portion 2 is adjusted to a predetermined level for each of the light exposure periods. In other words, if photons are incident on the APD 1 during one light exposure period, the amount of charge stored in the FD portion 2 is fixed. If the FD portion 2 and the MIM 8 are electrically connected together, the charge stored in the FD portion 2 is redistributed to the MIM 8 in accordance with the ratio between the capacitance $C_{MIM}$ of the MIM 8 and the capacitance $C_{FD}$ of the FD portion 2.

Thus, the terminal-to-terminal voltage $V_{MIM(i+1)}$ of the MIM 8 after the number of photons is counted as (i+1) satisfies the relationship indicated by formula (1), where the number of times of the light exposure period during which photons are incident in the light exposure step is counted as i (where i is an integer, and 1≤i≤(n−1); where n represents the number of times of the light exposure period set in the light exposure step).

$$V_{MIM(i+1)} = V_{MIM(i)} + (V_{FDA} - V_{FDB})\frac{C_{FD}}{C_{MIM}} \quad (1)$$

Here, $V_{FDA}$ is the electric potential of the FD portion 2 during the period IV shown in FIG. 4. In other words, it is the value of the electric potential $V_{FD}$ adjusted with the gate of the RST-TR 4 set at an intermediate electric potential. $V_{FDB}$ is the electric potential of the FD portion 2 during the period VII shown in FIG. 4. In other words, it is the electric potential of the FD portion 2 after electrons stored in the FD portion 2 have been transferred to the MIM 8. As shown in FIG. 7, the voltage $V_{MIM(i)}$ decreases in proportion to the count i. In the example shown in FIG. 7, increasing the count to 24 results in a gradual decrease in the voltage $V_{MIM(i)}$ from 3 V to 1.6 V. In contrast, even if the count is increased to 25 or more, the voltage $V_{MIM(i)}$ does not change from 1.6 V. This is because the amount of charge stored in the MIM 8 has reached its saturation value. In other words, the amount of change in the voltage $V_{MIM(i)}$ depends on the capacitance $C_{MIM}$ of the MIM 8. Moreover, it also depends on the ratio between the capacitance $C_{MIM}$ of the MIM 8 and the capacitance $C_{FD}$ of the FD portion 2.

Figure 9:
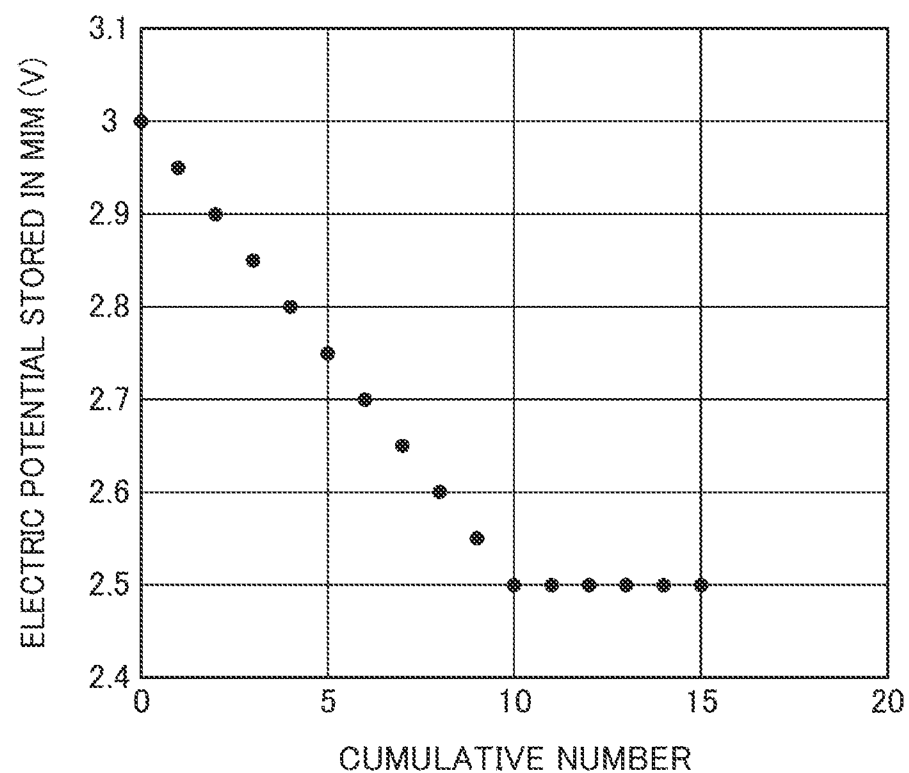
FIG. 9 shows an example of the relationship between the photon count and the electric potential stored in the capacitor in the light exposure step.

FIG. 8 shows an example of the relationship among the photon count, the charge transferred to the capacitor, and the electric potential stored in a capacitor in the light exposure step. FIG. 9 shows an example of the relationship between the photon count and the electric potential stored in the capacitor in the light exposure step. The graph shown in FIG. 9 is based on the numerical values shown in FIG. 8.

In the example shown in FIGS. 8 and 9, the electric potential RSD is +3 V, the capacitance $C_{FD}$ is 1.6 fF, and the capacitance $C_{MIM}$ is 16 fF. The electric potential $V_{FDA}$ is 2.0 V, and the electric potential $V_{FDB}$ is 2.5 V.

In the example shown in FIGS. 8 and 9, every time photons are incident during one exposure period, a charge of 0.8 coulombs (C) is stored in the MIM 8, and the electric potential stored in the MIM 8 corresponding to the above-described voltage $V_{MIM(i)}$ decreases by 0.05 V at a time. The electric potential stored in the MIM 8 decreases by 0.05 V at a time until the photon count in the light exposure step, i.e., the cumulative number, reaches ten, and when the cumulative number is ten, the electric potential reaches its saturation value. In other words, in the example shown in FIGS. 8 and 9, the number of times photons are incident can be counted until it reaches ten in the light exposure step.

Advantages

As described above, the solid state image sensor 100 according to this embodiment includes at least the plurality of pixel cells 10 arranged in a matrix, and the vertical scanning circuit (row control circuit) 40 configured to control operations of the plurality of pixel cells 10.

Each pixel cell 10 includes at least the APD 1 configured to convert received light (photons) into charge, the FD portion 2 configured to store the charge generated by the APD 1, and the TRN-TR 3 connected to the APD 1 and the FD portion 2.

Each pixel cell 10 further includes at least the RST-TR 4 connected to the first power supply 12 and the FD portion 2, the SF-TR 5 connected to the second power supply 13 and the FD portion 2 to output the voltage signal responsive to the amount of charge stored in the FD portion 2, and the SEL-TR 6 connected to the SF-TR 5 to transfer the output signal of the SF-TR 5 to the VSL 9.

Each pixel cell 10 still further includes at least the CNT-TR 7 connected to the FD portion 2, and the MIM 8 having terminals one of which is connected to the CNT-TR 7.

The vertical scanning circuit (row control circuit) 40 is configured to be able to supply different levels of voltages to the other terminals of the MIMs 8. Specifically, the voltage signal is supplied from the amplifier 41 of the vertical scanning circuit 40 to the terminal of the MIM 8 connected to the capacitor signal line 42. Supplying a predetermined selection signal to the amplifier 41 allows the Lo signal corresponding to the ground potential or the Hi signal with a higher voltage than the Lo signal to be applied to the MIM 8.

This embodiment can first reduce the number of the elements in each pixel cell 10 by one as compared to the known configuration disclosed in International Publication No. WO 2018/216400. Specifically, a first reset transistor in International Publication No. WO 2018/216400 can be omitted. This can reduce the size of each pixel cell 10, thus achieving a highly integrated solid state image sensor 100 as compared to the known configuration disclosed in International Publication No. WO 2018/216400.

This embodiment can reduce the number of transistors directly connected to the APD 1 as compared to the known configuration disclosed in International Publication No. WO 2018/216400. Specifically, a first reset transistor in International Publication No. WO 2018/216400 can be omitted.

It has been well known that a dark current which has generated in a transistor and which flows into a light receiving element connected to the transistor causes a noise component to be superimposed on a light receiving signal, and in turn degrades the quality of an image acquired. In particular, if the APD 1 is operated in the Geiger multiplication mode, an increase in the amount of the dark current flowing into the APD 1 sharply degrades the image quality.

In contrast, this embodiment can reduce the number of transistors directly connected to the APD 1, thus reducing the amount of the dark current flowing into the APD 1 as compared to the known configuration disclosed in International Publication No. WO 2018/216400. This can reduce the degradation of the image quality.

According to this embodiment, the electric potentials of the terminals of the MIMs 8 connected to the capacitor signal line 42 can be changed to different levels. As a result, in the read-out step, the difference between the reset level and the signal level described above can be increased, the noise component can be removed, and a photodetection signal with large amplitude can be obtained. This enables accurate detection of the number of times photons are incident on the APD 1.

Further, the vertical scanning circuit 40 is configured to be able to apply three or more different levels of voltages to the gates of the RST-TRs 4. Thus, adjusting the electric potential $V_{FD}$ of the FD portion 2 can uniformize the amount of charge stored in the FD portion 2 and in turn the amount of charge stored in the MIM 8 if photons are incident during one light exposure period. This enables detection of the number of times photons are incident on the APD 1 without providing a dedicated circuit, such as an analog-to-digital conversion circuit. In other words, while the solid state image sensor 100 is simply configured, the number of times photons are incident on the APD 1 can be accurately detected.

To detect photons, the charge that has generated in the APD 1 is stored in the MIM 8 via the FD portion 2 during a light exposure period. After repeatedly undergoing the light exposure period the predetermined number of times, the vertical scanning circuit 40 makes the VSL 9 read a photodetection signal out based on the amount of charge stored in the MIM 8. This enables accurate detection of the number of times photons are incident on the APD 1.

The magnitude of the photodetection signal output from the solid state image sensor 100 corresponds to the number of times of the light exposure period during which photons are incident on the APD 1.

This embodiment enables accurate detection of the number of times photons are incident on the APD 1 without providing a dedicated circuit, such as an analog-to-digital conversion circuit.

OTHER EMBODIMENTS

In the foregoing description, the embodiment serves as an example of the technique disclosed in the present application. However, the technique according to the present disclosure is not limited to these embodiments, and is also applicable to embodiments where modifications, substitutions, additions, or omissions are made appropriately without departing from the spirit of the present disclosure.

If a subject has a high illumination (e.g., an illumination higher than 0.1 lux), the APD 1 may be operated in the linear multiplication mode. In this case, a photodetection signal output during one light exposure period may be used without using the photocount function, just like a typical image sensor. In other words, the charge stored in the FD portion 2 does not always need to be stored in the MIM 8. The light exposure period can be adjusted through a known electronic shutter operation. Specifically, turning the RST-TR 4 on at a predetermined timing during a light exposure period may allow the light exposure period to be adjusted.

A determination circuit (not shown) configured to determine the illumination of the subject based on the output signal from the solid state image sensor 100 or the output signal that has further undergone signal processing may be provided in the peripheral circuit section 30. A level shift circuit (not shown) configured to shift the voltage level of the power supply 11 connected to the APD 1 based on the determination result of the determination circuit may be further provided in the peripheral circuit section 30. For example, if the subject has an illumination equal to or less than a predetermined value, the level shift circuit sets the voltage of the power supply 11 so that the APD1 operates in the Geiger multiplication mode. On the other hand, if the subject has an illumination higher than the predetermined value, the level shift circuit sets the voltage of the power supply 11 so that the APD1 operates in the linear multiplication mode. The determination circuit and the level shift circuit may be provided outside the solid state image sensor 100.

The solid state image sensor of the present disclosure is useful, because it can detect feeble light, and can be highly integrated.

The invention claimed is:

1. A solid state image sensor comprising at least:

a plurality of pixel cells arranged in a matrix; and a row control circuit configured to control operations of the plurality of pixel cells, each of the pixel cells including at least:

an avalanche photodiode configured to convert received light into charge;

a floating diffusion portion configured to store the charge generated in the avalanche photodiode;

a transfer transistor connected to the avalanche photodiode and the floating diffusion portion;

a reset transistor connected to a first power supply and the floating diffusion portion;

an amplifier transistor connected to a second power supply and the floating diffusion portion to output a voltage signal responsive to an amount of charge stored in the floating diffusion portion;

a selection transistor connected to the amplifier transistor to transfer an output signal from the amplifier transistor to a vertical signal line;

a count transistor connected to the floating diffusion portion; and a capacitor having terminals one of which is connected to the count transistor, the row control circuit being configured to be capable of applying three different levels of first to third voltages to gates of the reset transistors, the first voltage being set to be higher than the second voltage and the second voltage being set to be higher than the third voltage, applying the first voltage to gates of the reset transistors by the row control circuit fixing electric potentials of the floating diffusion portions at a same level as a power supply voltage of the first power supply, applying the second voltage to the gates of the reset transistors by the row control circuit changing potentials directly below the gates of the reset transistors to levels between potentials of sources of the reset transistors and potentials of drains of the reset transistors, and applying the third voltage to the gates of the reset transistors by the row control circuit turning the reset transistors off.

2. The solid state image sensor of claim 1, wherein the row control circuit applies the first voltage to the gates of the reset transistors before exposure of the pixel cells to light, and the row control circuit applies the second voltage to the gates of the reset transistors after an end of the exposure of the pixel cells to light.

3. The solid state image sensor of claim 1 wherein
during a light exposure period, charge that has generated in the avalanche photodiode is stored in the capacitor via the floating diffusion portion, and
after repeatedly undergoing the light exposure period a predetermined number of times, the row control circuit makes the vertical signal line read a photodetection signal based on an amount of charge stored in the capacitor.

4. The solid state image sensor of claim 2, wherein
during a light exposure period, charge that has generated in the avalanche photodiode is stored in the capacitor via the floating diffusion portion, and
after repeatedly undergoing the light exposure period a predetermined number of times, the row control circuit makes the vertical signal line read a photodetection signal based on an amount of charge stored in the capacitor.

5. The solid state image sensor of claim 3, wherein
a magnitude of the photodetection signal corresponds to the number of times of the light exposure period during which photons are incident on the avalanche photodiode.

6. The solid state image sensor of claim 4, wherein
a magnitude of the photodetection signal corresponds to the number of times of the light exposure period during which photons are incident on the avalanche photodiode.

* * * * *